(12) United States Patent
Katano et al.

(10) Patent No.: US 10,595,472 B2
(45) Date of Patent: Mar. 24, 2020

(54) FILM FOR AGRICULTURAL GREENHOUSE AND AGRICULTURAL GREENHOUSE

(71) Applicant: FUJIFILM Corporation, Tokyo (JP)

(72) Inventors: Shogo Katano, Kanagawa (JP); Yui Omi, Kanagawa (JP); Kimito Washiya, Kanagawa (JP); Akihiro Ikeyama, Kanagawa (JP); Eiji Ishii, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 283 days.

(21) Appl. No.: 15/628,131

(22) Filed: Jun. 20, 2017

(65) Prior Publication Data

US 2017/0280637 A1    Oct. 5, 2017

Related U.S. Application Data

(63) Continuation of application No. PCT/JP2015/080215, filed on Oct. 27, 2015.

(30) Foreign Application Priority Data

Dec. 26, 2014 (JP) ................. 2014-265310
Mar. 27, 2015 (JP) ................. 2015-067332
Mar. 27, 2015 (JP) ................. 2015-067456

(51) Int. Cl.
*A01G 9/14* (2006.01)
*A01G 13/02* (2006.01)
(Continued)

(52) U.S. Cl.
CPC ............. *A01G 9/1438* (2013.01); *A01G 9/18* (2013.01); *A01G 13/02* (2013.01); *C08J 5/18* (2013.01);
(Continued)

(58) Field of Classification Search
CPC .......... A01G 1/14; A01G 1/1438; A01G 1/16; A01G 13/02; A01G 13/0275; A01G 9/14; A01G 9/1438; A01G 9/16
(Continued)

(56) References Cited

U.S. PATENT DOCUMENTS 1,580,287 A * 4/1926 Colle ...................... B29C 70/08
                                                                  119/437
5,270,102 A    12/1993 Allingham
(Continued)

FOREIGN PATENT DOCUMENTS

CN         103665442 A       3/2014
CN         103665442 B       4/2018
(Continued)

OTHER PUBLICATIONS

Notification of Reason for Refusal issued by the Korean Intellectual Property Office dated Sep. 10, 2018, in connection with corresponding Korean Patent Application No. 10-2017-7017053.
(Continued)

*Primary Examiner* — David J Parsley
*Assistant Examiner* — Danielle A Clerkley
(74) *Attorney, Agent, or Firm* — Edwards Neils LLC; Jean C. Edwards, Esq.

(57) ABSTRACT

Objects of the present invention are to provide a film for an agricultural greenhouse that can maintain a $CO_2$ concentration necessary for the photosynthesis of plants even when ventilation is not performed and to provide an agricultural greenhouse using the film. The film for an agricultural greenhouse of the present invention is a cellulose film which contains a cellulose acylate resin and has an equilibrium moisture content of 4% to 8% at a temperature of 25° C., a relative humidity of 80% and a thickness of 60 to 200 μm.

20 Claims, 4 Drawing Sheets

(51) Int. Cl.
*C08L 1/10* (2006.01)
*C08L 1/12* (2006.01)
*A01G 9/18* (2006.01)
*C08J 5/18* (2006.01)
*C08K 9/12* (2006.01)
*C08L 1/02* (2006.01)
*A01G 9/24* (2006.01)

(52) U.S. Cl.
CPC ...... *C08K 9/12* (2013.01); *C08L 1/02* (2013.01); *C08L 1/10* (2013.01); *C08L 1/12* (2013.01); *A01G 9/1415* (2013.01); *A01G 9/246* (2013.01); *C08J 2301/10* (2013.01); *C08J 2301/12* (2013.01); *Y02A 40/252* (2018.01); *Y02A 40/268* (2018.01)

(58) Field of Classification Search
USPC .............................................................. 47/17
See application file for complete search history.

(56) References Cited

U.S. PATENT DOCUMENTS

| | | | | |
|---|---|---|---|---|
| 2005/0054634 | A1* | 3/2005 | Busch | C07D 471/04 514/215 |
| 2008/0013341 | A1* | 1/2008 | Sano | G02B 5/045 362/620 |
| 2008/0020217 | A1* | 1/2008 | Makinoshima | C08J 3/205 428/473.5 |
| 2008/0177056 | A1 | 7/2008 | Hashimoto et al. | |
| 2009/0032986 | A1* | 2/2009 | Fujita | C08J 5/18 264/1.34 |
| 2009/0146346 | A1* | 6/2009 | Noritsune | B29C 48/92 264/556 |
| 2012/0249933 | A1 | 10/2012 | Toyama et al. | |
| 2014/0160404 | A1* | 6/2014 | Yamada | G02B 5/208 349/96 |
| 2016/0033687 | A1* | 2/2016 | Wakizaka | G02B 1/14 359/507 |

FOREIGN PATENT DOCUMENTS

| | | |
|---|---|---|
| JP | H01-320161 A | 12/1989 |
| JP | H06-279756 A | 10/1994 |
| JP | H10-95860 A | 4/1998 |
| JP | H11-335422 A | 12/1999 |
| JP | 2000-043200 A | 2/2000 |
| JP | 2000-280426 A | 10/2000 |
| JP | 2007-228828 A | 9/2007 |
| JP | 2009-039056 A | 2/2009 |
| JP | 2009-225708 A | 10/2009 |
| JP | 2010-017093 A | 1/2010 |
| JP | 2011-010590 A | 1/2011 |
| JP | 2011-127045 A | 6/2011 |
| JP | 2013-139541 A | 7/2013 |
| JP | 2014-198035 A | 10/2014 |
| KR | 10-2006-0044730 A | 5/2006 |
| KR | 10-2007-0007949 A | 1/2007 |
| TW | 201012835 A * | 7/2009 .............. C08F 22/06 |

OTHER PUBLICATIONS

Notification of Reasons for Refusal issued by the Japanese Patent Office dated Aug. 29, 2017, in connection with corresponding Japanese Patent Application No. 2015-067332.

Notification of Reasons for Refusal issued by the Japanese Patent Office dated Aug. 29, 2017, in connection with corresponding Japanese Patent Application No. 2014-265310.

Notification of Reasons for Refusal issued by the Japanese Patent Office dated Aug. 29, 2017, in connection with corresponding Japanese Patent Application No. 2015-067456.

Notification of Reasons for Refusal issued by the Japanese Patent Office dated Oct. 17, 2017, in connection with corresponding Japanese Patent Application No. 2015-067345.

International Search Report issued in PCT/JP2015/080215 dated Feb. 2, 2016.

Written Opinion issued in PCT/JP2015/080215 dated Feb. 2, 2016.

International Preliminary Report on Patentability issued by WIPO dated Jul. 6, 2017, in connection with International Patent Application No. PCT/JP2015/080215.

Notification of Reasons for Refusal issued by the Japanese Patent Office dated May 30, 2017, in connection with corresponding Japanese Patent Application No. 2015-067345.

Office Action issued by the State Intellectual Property Office of the People's Republic of China dated Jun. 14, 2019, in connection with Chinese Patent Application No. 201580071037.6.

* cited by examiner

FILM FOR AGRICULTURAL GREENHOUSE AND AGRICULTURAL GREENHOUSE

CROSS-REFERENCE TO RELATED APPLICATIONS

This application is a Continuation of PCT International Application No. PCT/JP2015/080215 filed on Oct. 27, 2015, which was published under PCT Article 21(2) in Japanese, and which claims priority under 35 U.S.C. § 119(a) to Japanese Patent Application No. 2014-265310 filed on Dec. 26, 2014, Japanese Patent Application No. 2015-067332 filed on Mar. 27, 2015 and Japanese Patent Application No. 2015-067456 filed on Mar. 27, 2015. The above applications are hereby expressly incorporated by reference, in their entirety, into the present application.

BACKGROUND OF THE INVENTION

1. Field of the Invention

The present invention relates to a film for an agricultural greenhouse and an agricultural greenhouse.

2. Description of the Related Art

Regarding an agricultural greenhouse using a transparent film which contains vinyl chloride, polyethylene, a polyethylene-vinyl acetate copolymer, polyethylene terephthalate (PET), a polyethylene-tetrafluoroethylene copolymer, or the like as a main material, it is known that, during the daytime in summer or the like, the internal temperature of the greenhouse increases up to 40° C. or higher due to the solar radiation heat resulting from sunlight. Furthermore, it is known that, during the daytime in winter or the like, the inside of the greenhouse cannot be effectively thermally insulated by only the solar radiation heat resulting from sunlight.

Therefore, for the daytime in summer, a method of cooling the internal air within the greenhouse by using an air conditioner, a method of scattering water droplets (mist) inside the greenhouse by using a mist cooling device (for example, a mist fan or a mist cooler) such that the inside of the greenhouse is cooled by the heat of vaporization, and the like are known (for example, see JP2010-17093A).

Furthermore, for the daytime in winter, a method of supplying heat to the inside of the greenhouse from a heat source such as a heater so as to inhibit the decrease in temperature and the like are known.

For example, JP2010-17093A describes "an air conditioning method for a greenhouse, comprising installing a circulation fan in the vicinity of an exhaust port of an indoor unit of a heat pump of an air conditioning device of a greenhouse in which the indoor unit of the heat pump is installed on the inside of the greenhouse, such as a hothouse or a plastic greenhouse, and an outdoor unit of the heat pump is installed on the outside of the greenhouse, sending hot air or cold air by the circulation fan to the circulation fan and other circulation fans provided in a longitudinal direction, and securing a flow of hot air or cold air in a direction approximately horizontal to the longitudinal direction of the greenhouse and a flow of hot air or cold air covering a broad area while mixing the hot air or the cold air exhausted from the exhaust port with internal air staying in the vicinity of the exhaust port by using the circulation fan and other circulation fans such that the hot air or the cold air is evenly diffused in the entire greenhouse" ([Claim 5]).

In the method using a mist cooling device, due to the vaporization of water drops, the internal temperature of the greenhouse becomes high. Therefore, ventilating means for exchanging the internal air within the greenhouse is generally used. For example, JP2014-198035A describes "a plant cultivation greenhouse having a constitution in which an upper portion of a greenhouse body (1) is covered with a transparent covering material (2), the inside of the greenhouse body (1) is partitioned into two chambers of upper and lower chambers consisting of an upper chamber (21) on a ceiling side and a lower chamber (22) functioning as a cultivation chamber by a partitioning material (6) which enables air to flow up and down, an insect-proof net (3) is provided on a lateral surface (11) of the lower chamber (22), the inside of the upper chamber (21) is cooled with mist by a mist cooling device (7), an exhaust fan (5) for exhausting the internal air within the upper chamber (21) outside the greenhouse is provided, and the internal air within the upper chamber (21) is forcedly exhausted by the exhaust fan (5) such that the internal air within the lower chamber (22) is aspirated into the upper chamber (21) and then the external air is introduced into the lower chamber (22) through the insect-proof net (3)" ([Claim 1]).

Meanwhile, an agricultural greenhouse is known which has a double layer structure formed of two layers of film so as to tolerate the low temperature during the winter season.

For example, JP2011-10590A describes "a thermal insulation sheet which is disposed to totally cover a lateral surface of an agricultural greenhouse, wherein at least two synthetic resin sheets are fused in a horizontal direction at sites that separate at a predetermined interval in a vertical direction such that a plurality of portions of air flow paths is formed, and at each of the sites where the synthetic resin sheets are fused, a plurality of drainage portions communicating with each of the air flow paths is provided in the horizontal direction at a necessary interval" ([Claim 1]). JP2011-10590A also describes an aspect in which the synthetic resin sheet positioned on the outside is a non-gas-permeable sheet while the synthetic resin sheet positioned on the inside is a gas-permeable sheet in which a plurality of micropores is formed ([Claim 3] and [Claim 4]).

Generally, the main material of the film for an agricultural greenhouse is vinyl chloride, polyethylene, a polyethylene-vinyl acetate copolymer, polyethylene terephthalate (PET), a polyethylene-tetrafluoroethylene copolymer, or the like.

Because the agricultural greenhouse prepared from such a material has low moisture permeability (water vapor permeability), water vapor from the soil adheres to the internal surface of the film and form water droplets. It is known that, as a result, unfortunately, the transparency of the film deteriorates, and the water droplets drip and damage the plants (for example, see JP1989-320161A (JP-H01-320161A) and JP1994-279756A (JP-H06-279756A)).

As a solution to the above problem, for example, JP2009-039056A suggests "an agricultural laminated film comprising a base film which is constituted by multiple layers including two outermost layers containing a thermoplastic resin and an interlayer containing a hydrophilic resin and a hydrophilic coating film which is on the uppermost surface of at least one surface of the base film, wherein a plurality of micropores is provided which is obtained by performing a perforation process by using a needle having thorn-like projections."

SUMMARY OF THE INVENTION

The inventors of the present invention conducted an examination regarding the ventilation at the time of performing air conditioning in a greenhouse. As a result, they revealed that, if ventilation is performed, needless to say, the air conditioning efficiency decreases, if air conditioning is performed without ventilation so as to maintain the efficiency of air conditioning, carbon dioxide ($CO_2$) in the greenhouse is consumed due to the photosynthesis of plants in the daytime, and consequently the $CO_2$ concentration necessary for the photosynthesis of plants unfortunately becomes insufficient.

Furthermore, the inventors of the present invention revealed that the aforementioned problem also occurs when plants are grown without performing ventilation so as to prevent pest invasion.

Therefore, in a first aspect, the present invention aims to provide a film for an agricultural greenhouse that can maintain a $CO_2$ concentration necessary for the photosynthesis of plants even if ventilation is not performed, and an agricultural house using the film (hereinafter, simply referred to as a "first object").

Meanwhile, the inventors of the present invention conducted an examination regarding a method for cooling the inside of a greenhouse by using a spray device. As a result, they revealed that, the agricultural greenhouse in which air conditioning (cooling) is performed using mist as described in JP2014-198035A or the like needs to be ventilated so as to decrease the internal temperature of the greenhouse increased due to spraying, and accordingly, a cumbersome operation of alternately performing mist cooling and ventilation unfortunately needs to be carried out, and there is an inflow of pests into the greenhouse due to ventilation.

Therefore, in a second aspect, the present invention aims to provide an agricultural greenhouse that does not require ventilation means and can prevent the inflow of pests (hereinafter, simply referred to as a "second object").

Furthermore, the inventors of the present invention conducted an examination regarding the thermal insulation sheet described in JP2011-10590A. As a result, they found out that, in a case where a gas-permeable sheet in which micropores are formed is used as the synthetic resin sheet (lining film) positioned on the inside, the effect of preventing dew condensation occurring on the inside of the sheet (inside of the agricultural greenhouse) due to a temperature difference becomes insufficient, the light transmittance is reduced, and hence the growth of plants or the thermal insulation effect in the agricultural greenhouse is likely to be impaired.

Therefore, in a third aspect, the present invention aims to provide an agricultural greenhouse with a high light transmittance in which the dew condensation occurring on the inside of a lining film is inhibited (hereinafter, simply referred to as a "third object).

In addition, the inventors of the present invention conducted an examination regarding the films for an agricultural greenhouse described in JP1989-320161A (JP-H01-320161A), JP1994-279756A (JP-H06-279756A), JP2009-039056A, and the like known in the related art. As a result, they revealed that, if drip-proofness is improved, workability deteriorates in some cases, and it is difficult to accomplish both the performances to a high level.

Therefore, in a fourth aspect, the present invention aims to provide a film for an agricultural greenhouse excellent in both drip-proofness and workability (hereinafter, simply referred to as a "fourth object").

In order to achieve the first object, the inventors of the present invention conducted an intensive examination. As a result, they found that, by using a cellulose film which contains a cellulose acylate resin and has a moisture content represented by an equilibrium moisture content of 4% to 8% at a temperature of 25° C., a relative humidity of 80% and a thickness of 60 to 200 μm, the $CO_2$ concentration necessary for the photosynthesis of plants can be maintained even if ventilation is not performed. Based on what they have found, the inventors accomplished the first aspect of the present invention.

That is, the inventors found that the first object can be achieved by the following constitution.

[1] A film for an agricultural greenhouse that is a cellulose film, comprising a cellulose acylate resin, in which the film has an equilibrium moisture content of 4% to 8% at a temperature of 25° C. and a relative humidity of 80% and a thickness of 60 to 200 μm.

[2] The film for an agricultural greenhouse described in [1] that has a light transmittance equal to or higher than 80%.

[3] The film for an agricultural greenhouse described in [1] or [2] that has a water vapor permeability equal to or higher than 600 g/m²/24 h.

[4] The film for an agricultural greenhouse described in any one of [1] to [3], in which a degree of acetyl group substitution of the cellulose acylate resin is 2.5 to 3.0.

[5] An agricultural greenhouse comprising a frame and a film, in which the film is the film for an agricultural greenhouse described in any one of [1] to [4] and forms a space walled off from the outside by being spread over the frame.

[6] The agricultural greenhouse described in [5] that does not have a ventilation means for exhausting internal air within the space to the outside.

Furthermore, in order to achieve the second object, the inventors of the present invention conducted an intensive examination. As a result, they found that, by constituting a greenhouse by using a film which contains a cellulose acylate resin and has a water vapor permeability equal to or higher than 600 g/m²/24 h and a thickness of 80 to 200 μm, it is possible to inhibit the inflow of pests without using ventilation means. Based on what they have found, the inventors accomplished the second aspect of the present invention.

That is, the inventors found that the second object can be achieved by the following constitution.

[1] An agricultural greenhouse comprising a frame, a film, and a spray device which sprays atomized water to the inside of a space, in which the film is a cellulose film which forms the space walled off from the outside by being spread over the frame, contains a cellulose acylate resin, and has a water vapor permeability equal to or higher than 600 g/m²/24 h and a thickness of 80 to 200 μm.

[2] The agricultural greenhouse described in [1], in which the spray device is a mist cooling device which cools the space by spraying atomized water into the space.

[3] The agricultural greenhouse described in [1] or [2] that does not have ventilation means for exhausting internal air within the space to the outside.

[4] The agricultural greenhouse described in any one of [1] to [3], in which a degree of acetyl group substitution of the cellulose acylate resin is 2.5 to 3.0.

In addition, in order to achieve the third object, the inventors of the present invention conducted an intensive examination. As a result, they found that, by using a cellulose film, which contains a cellulose acylate resin and has a water vapor permeability equal to or higher than 600 g/m²/24 h, as a lining film and providing ventilation means for exchanging air existing in an interspace between a lining film and a covering film, it is possible to inhibit the dew condensation occurring on the inside of the lining film and increase the light transmittance. Based on what they have found, the inventors accomplished the third aspect.

That is, the inventors found that the third object can be achieve by the following constitution.

[1] An agricultural greenhouse comprising a covering film which forms a space walled off from the outside, a lining film which is provided on the inside of the covering film such that an interspace is formed between the covering film and the lining film, and ventilation means for exchanging at least a portion of the air existing in the interspace with the external air, in which at least a portion of the lining film is constituted with a cellulose film which contains a cellulose acylate resin and has a water vapor permeability equal to or higher than 600 g/m²/24 h.

[2] The agricultural greenhouse described in [1], in which at least a portion of the covering film includes the ventilation means, and the ventilation means is a film having a water vapor permeability equal to or higher than 500 g/m²/24 h.

[3] The agricultural greenhouse described in [2], in which the ventilation means is the cellulose film which contains a cellulose acylate resin and has a water vapor permeability equal to or higher than 600 g/m²/24 h.

[4] The agricultural greenhouse described in any one of [1] to [3], in which a roof portion of the lining film is constituted with the cellulose film.

Moreover, in order to achieve the fourth object, the inventors of the present invention conducted an intensive examination. As a result, they found that, by using a film which contains a cellulose acylate resin and has a predetermined level of water vapor permeability and modulus of elasticity, both drip-proofness and workability can be improved. Based on what they have found, the inventors accomplished the fourth aspect of the present invention.

That is, the inventors found that the fourth object can be achieved by the following constitution.

[1] A film for an agricultural greenhouse, comprising a cellulose acylate resin, in which the film has a water vapor permeability equal to or higher than 600 g/m²/24 h and a modulus of elasticity of less than 3.0 GPa.

[2] The film for an agricultural greenhouse described in [1], further comprising a plasticizer containing a polyether ester and/or a polyether, in which a content of the plasticizer is 10 to 70 parts by mass with respect to 100 parts by mass of the cellulose acylate resin.

[3] The film for an agricultural greenhouse described in [1] or [2], in which a degree of acetyl group substitution of the cellulose acylate resin is 2.5 to 3.0.

[4] The film for an agricultural greenhouse described in [2] or [3], in which the plasticizer contains polyether ester represented by the following Formula (A),

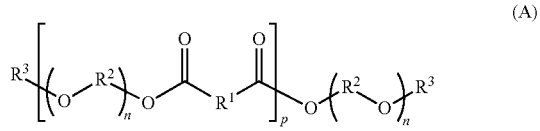

in Formula (A), $R^1$ represents a divalent aliphatic hydrocarbon group having 2 to 10 carbon atoms, $R^2$ each independently represents a divalent aliphatic hydrocarbon group having 2 to 6 carbon atoms, $R^3$ each independently represents a hydrogen atom, an alkyl group having 1 to 20 carbon atoms, an aryl group having 6 to 20 carbon atoms, or an acyl group having 2 to 20 carbon atoms, n each independently represents an integer of 1 to 20, p represents an integer of 1 to 15, and a plurality of $R^1$'s, $R^2$'s, and n's contained in a repeating unit may be the same as or different to each other.

[5] The film for an agricultural greenhouse described in [4], in which $R^3$ in Formula (A) is an alkyl group having 1 to 20 carbon atoms.

[6] The film for an agricultural greenhouse described in [2] or [3], in which the plasticizer contains a polyether represented by the following Formula (B),

in Formula (B), $R^4$ represents a divalent aliphatic hydrocarbon group having 2 to 6 carbon atoms, $R^5$ and $R^6$ each independently represents a hydrogen atom, an alkyl group having 1 to 20 carbon atoms, an aryl group having 6 to 20 carbon atoms, an acyl group having 2 to 20 carbon atoms, a (meth)acryloyl group, or a group represented by the following Formula (b) obtained by polymerization of a (meth)acryloyl group, m represents an integer of 1 to 20, and a plurality of $R^4$'s contained in a repeating unit may be the same as or different to each other,

in Formula (b), * represents an oxygen atom bonded to $R^5$ or $R^6$ in Formula (B), $R^7$ represents a hydrogen atom or a methyl group, q represents an integer of 1 to 10, and a plurality of $R^7$'s contained in a repeating unit may be the same as or different to each other.

[7] The film for an agricultural greenhouse described in [6], in which $R^5$ in Formula (B) is an aryl group having 6 to 20 carbon atoms or a (meth)acryloyl group.

[8] The film for an agricultural greenhouse described in any one of [1] to [7] that has a thickness of 60 μm to 200 μm.

According to the first aspect of the present invention, it is possible to provide a film for an agricultural greenhouse that can maintain a $CO_2$ concentration necessary for the photosynthesis of plants even if ventilation is not performed and provide an agricultural greenhouse using the film.

According to the second aspect of the present invention, it is possible to provide an agricultural greenhouse which does not require ventilation means and can inhibit the inflow of pests.

According to the third aspect of the present invention, it is possible to provide an agricultural greenhouse with a high light transmittance in which the dew condensation occurring on the inside of a lining film is inhibited.

According to the fourth aspect of the present invention, it is possible to provide a film for an agricultural greenhouse excellent in both drip-proofness and workability.

DESCRIPTION OF THE PREFERRED EMBODIMENTS

Figure 1:
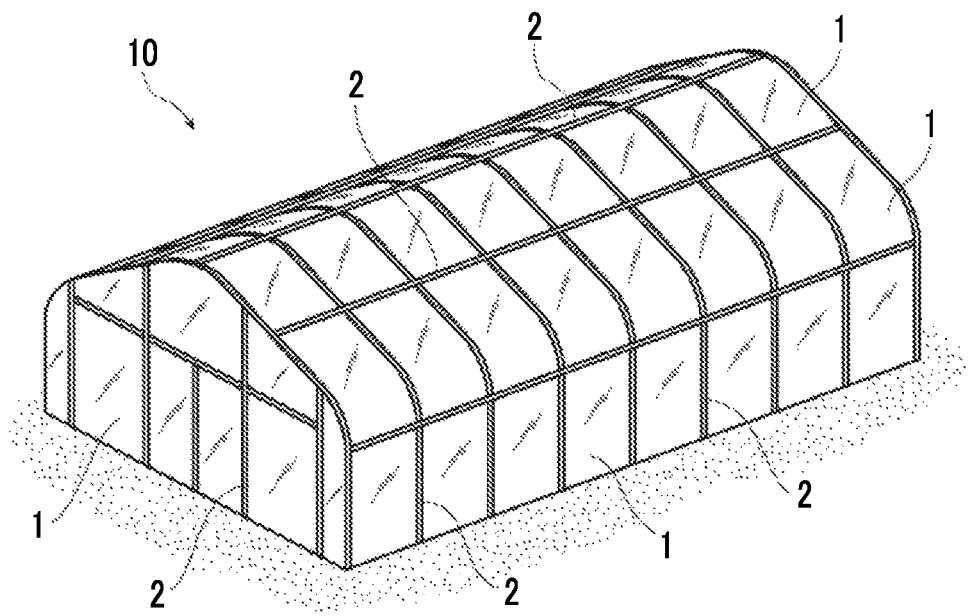
FIG. 1 is a schematic perspective view showing an example of the exterior of an agricultural greenhouse according to the first and second aspects of the present invention.

Hereinafter, the first to fourth aspects of the present invention will be specifically described.

The constituents described below will be explained based on representative embodiments of the present invention in some cases, but the present invention is not limited to the embodiments.

In the present specification, a range of numerical values described using "to" means a range which includes the numerical values listed before and after "to" as a lower limit and an upper limit.

[Film for an Agricultural Greenhouse (First Aspect)]

The film for an agricultural greenhouse according to the first aspect of the present invention is a cellulose film which contains a cellulose acylate resin and has an equilibrium moisture content of 4% to 8% at a temperature of 25° C., a relative humidity of 80% and a thickness of 60 to 200 μm.

Herein, the equilibrium moisture content at a temperature of 25° C. and a relative humidity of 80% is a value obtained in a manner in which a film as a measurement target (sample) is humidified for 24 hours or longer in an environment with a temperature of 25° C. and a relative humidity of 80%, a sample having a mass (500 mg) appropriate for the measurement is then obtained from the film, the amount of moisture is measured using a Karl Fischer moisture meter (AQ-2200, manufactured by HIRANUMA SANGYO Co., LTD.), and the measured amount of moisture (mg) is divided by the mass of the sample (500 mg).

As described above, in the first aspect of the present invention, by using the cellulose film which contains a cellulose acylate resin, has an equilibrium moisture content of 4% to 8% at a temperature of 25° C., a relative humidity of 80% and a thickness of 60 to 200 μm, a $CO_2$ concentration necessary for the photosynthesis of plants can be maintained even if ventilation is not performed.

The reason why the aforementioned effects are brought about is unclear, but is assumed to be as below according to the inventors of the present invention.

Generally, it is known that a substance permeates into a film by two kinds of methods, physical diffusion and carrier transport. It is considered that, in the present invention, due to the carrier transport by which the aforementioned cellulose film takes in $CO_2$ from the outside by using water as a medium, the $CO_2$ concentration can be maintained.

That is, because the film for an agricultural greenhouse according to the first aspect of the present invention has an affinity to water that is higher than that of a general film for an agricultural greenhouse (for example, vinyl chloride or polyethylene terephthalate (PET)), the aforementioned equilibrium moisture content can be achieved. Herein, a decrease of strength of the films, having a higher hydrophilicity (for example, polyvinyl alcohol (PVA)), due to the water contained is not observed in the film for an agricultural greenhouse according to the first aspect of the present invention.

It is considered that, consequently, in a case where an environment of high temperature and humidity is created in a greenhouse, because the cellulose film contains water and $CO_2$ outside the greenhouse is adsorbed onto or dissolves in water in the cellulose film, $CO_2$ can enter the greenhouse.

It is considered that the film for an agricultural greenhouse according to the first aspect of the present invention can bring in $CO_2$ from the outside of the greenhouse as described above. As a result of actually measuring a $CO_2$ permeability of the aforementioned cellulose film, it was confirmed that the $CO_2$ permeability at a temperature of 25° C. and a relative humidity of 80% set to simulate a cultivation environment in an agricultural greenhouse is equal to or higher than $1.0 \times 10^{-6}$ ($cm^3/(s \cdot cm^2 \cdot cmHg)$).

That is, the film for an agricultural greenhouse according to the first aspect of the present invention can also be mentioned as a film for an agricultural greenhouse which contains a cellulose acylate resin and has a $CO_2$ permeability equal to or higher than $1.0 \times 10^{-6}$ ($cm^3/(s \cdot cm^2 \cdot cmHg)$) at a temperature of 25° C. and a relative humidity of 80%.

Herein, the $CO_2$ permeability of a general film is measured under dry film conditions, that is, based on the "differential pressure method" described in JIS K 6275-1.

Specifically, carbon dioxide is supplied to the surface (supply side) of a sample under a pressure of 800 kPa, and the pressure of the back surface (permeation side) is reduced down to 3 Pa by using a vacuum pump. Then, the vacuum pump is stopped, a pressure change of the permeation side is recorded, and the $CO_2$ permeability is calculated by a time-delay method according to JIS K 6275-1. The $CO_2$ permeability is measured at a temperature of 40° C. within a sample evaluation area of 3.14 $cm^2$.

In contrast, the $CO_2$ permeability of the film for an agricultural greenhouse according to the first aspect of the present invention refers to a value measured under humid film conditions, that is, a value obtained by measuring a $CO_2$ permeability at a temperature of 25° C. and a relative humidity of 80% set to simulate a cultivation environment in an agricultural greenhouse by the following method.

First, by using frameworks made of stainless steel, a skeleton of 25 cm×33 cm×33 cm was assembled, and each film was bonded to all the surfaces (6 surfaces) thereof, thereby preparing a small-sized greenhouse test sample.

Then, the greenhouse test sample was humidified for 24 hours or longer in an environment with a temperature of 25° C. and a relative humidity of 80%, a $CO_2$ concentration meter (TR-76UI, manufactured by T&D Corporation) was then installed on the inside of the sample, $CO_2$ gas was blown into the sample until the concentration thereof reached 10,000 ppm, and the inside of the greenhouse test sample was sealed using a pressure-sensitive adhesive tape.

Thereafter, the sample was installed in an environment with a temperature of 25° C. and a relative humidity of 80%, the surface (film) of the greenhouse test sample was placed in running water such that the sample was wet all the time, and the trend in $CO_2$ gas concentration in the environment was recorded for 24 hours.

From the results obtained by recording the decrease in the internal $CO_2$ gas concentration for 24 hours, a rate of decrease in the $CO_2$ gas concentration was determined and compared with fitted $CO_2$ gas concentration obtained using theoretical values, thereby obtaining a $CO_2$ permeability coefficient under humid film conditions (a temperature of 25° C. and a relative humidity of 80%).

The fitted $CO_2$ gas concentration was obtained by calculating T representing the amount of $CO_2$ permeating per unit time (that is, $CO_2$ permeability) by the following equation and plotting a theoretical change of $CO_2$ concentration with respect to the time elapsed.

For the $CO_2$ concentration, on the assumption that gas may move for 1 second under the initial pressure difference conditions, the values of the $CO_2$ permeability coefficient was fitted to the actual measured value.

$T\ (CO_2\ \text{permeability}) = (CO_2\ \text{permeability coefficient} \times \text{surface area of film} \times \text{pressure difference})/\text{film thickness}$ <Cellulose Acylate Resin>

The cellulose acylate resin contained in the film for an agricultural greenhouse according to the first aspect of the present invention is not particularly limited, and it is possible to use those known in the related art such as a cellulose acylate resin containing an aliphatic acyl group having 2 to 22 carbon atoms (for example, an acetyl group, a propionyl group, a butyryl group, or a pentanoyl group) and a cellulose acylate resin containing at least one kind of an unsubstituted aromatic acyl group.

From the viewpoint of retaining the water vapor permeability which will be described later, the content of the cellulose acylate resin is preferably 60% to 90% by mass and more preferably 65% to 80% by mass, with respect to the total mass of the cellulose film.

Examples of raw material cellulose of the cellulose acylate resin include cotton linter, Ambaric hemp, wood pulp (hardwood pulp and softwood pulp), and the like. One kind of these may be used singly, or two or more kinds thereof may be used in combination.

Among these, as the raw material cellulose, either or both cotton linter and wood pulp are preferable.

It is preferable that either or both cotton linter and wood pulp contain α-cellulose in a proportion equal to or higher than 80%.

Furthermore, in either or both cotton linter and wood pulp, mannose/xylose preferably equals 0.35/1 to 3.0/1 (molar ratio), and the total content thereof is preferably 0.01 to 5 mol %.

In a case where the cotton linter and the wood pulp are used in combination, a mixing ratio therebetween is preferably 5/95 to 95/5.

The cellulose acylate constituting the cellulose acylate resin is a carboxylic acid ester of cellulose and preferably, for example, a lower carboxylic acid ester of the cellulose.

Specific examples of the cellulose acylate include cellulose acetate, cellulose acetate propionate, cellulose acetate butyrate, cellulose acetate stearate, cellulose acetate benzoate, and the like.

Among these, cellulose acetate is preferable, and specifically, triacetyl cellulose (TAC) is more preferable.

It is preferable that the cellulose acylate is manufactured by combining any of an activation step (pretreatment step), an acylation step (in a case of acetyl, an acetylation step), a maturing step, a precipitation step, a purification step, a drying step, and a grinding step.

The raw material cotton of the cellulose acylate or the synthesis method thereof is described in pages 7 to 12 of the technical report from Japanese Institute of Invention and Innovation (open technique No. 2001-1745, published on Mar. 15, 2001, Japanese Institute of Inventions and Innovation).

The viscosity average polymerization degree (DP) of the cellulose acylate is preferably 200 to 700.

Furthermore, the ratio (Mw/Mn) of weight-average molecular weight (Mw)/number-average molecular weight (Mn) of the cellulose acylate is preferably 1.0 to 5.0, more preferably 1.0 to 4.0, and even more preferably 1.5 to 3.0.

Herein, the viscosity average polymerization degree refers to the average molecular weight determined by a viscosity method (ASTM D2857), and the weight-average molecular weight and the number-average molecular weight each refer to a molecular weight measured by a gel permeation chromatography (GPC) method.

It is preferable that, in the cellulose acylate, the amount of residual acetic acid or the amount of residual carboxylic acid having 3 to 22 carbon atoms is equal to or less than 0.5% by mass.

It is preferable that the cellulose acylate contains at least one kind of an alkali metal and/or an alkaline earth metal in an amount of 1 ppb to 10,000 ppm.

It is preferable that the amount of the cellulose acylate extracted using acetone at a temperature of 25° C. is equal to or less than 15% by mass.

It is preferable that the cellulose acylate contains an acid having an acid dissociation constant of 1.93 to 4.5, a partially esterified substance, or a salt of these.

It is preferable that the moisture content of the cellulose acylate is equal to or less than 2% by mass.

Furthermore, it is preferable that the yellowness index of the cellulose acylate is 0.1 to 10.

It is preferable that the haze of the cellulose acylate is 0.05% to 5%.

Furthermore, it is preferable that the light transmittance of the cellulose acylate is equal to or higher than 80% and more preferably equal to or higher than 85%.

It is preferable that Tg of the cellulose acylate is 80° C. to 200° C.

Furthermore, it is preferable that the crystallization heating value of the cellulose acylate is 2 to 20 J/g.

In the first aspect of the present invention, it is preferable that a degree of substitution of a hydroxyl group on the cellulose in the cellulose acylate satisfies the following Expressions (1) and (2)

$2.0 \leq SA + SB \leq 3.0$        Expression (1)

$0 \leq SA \leq 3.0$        Expression (2)

In the expressions, "SA" represents a degree of substitution of an acetyl group substituting a hydrogen atom of a hydroxyl group on the cellulose, and "SB" represents a degree of substitution of an acyl group other than the acetyl group that substitutes a hydrogen atom of a hydroxyl group on the cellulose.

Expression (2) is preferably represented by the following Expression (3) because then the workability of the obtained film for an agricultural greenhouse according to the first aspect of the present invention is further improved. Expression (2) is more preferably represented by the following Expression (4), because then the equilibrium moisture content increases, and the $CO_2$ concentration can be kept to be approximately the same as the external $CO_2$ concentration of the greenhouse.

$$2.0 \leq SA \leq 3.0 \quad \text{Expression (3)}$$

$$2.2 \leq SA \leq 2.6 \quad \text{Expression (4)}$$

<Additives>

Depending on the usage environment, the film for an agricultural greenhouse according to the first aspect of the present invention may contain additives such as a plasticizer, a matting agent, a deterioration preventing agent, and an ultraviolet absorbent.

Specific examples of the plasticizer suitably include an ester-based plasticizer containing a polyether ester represented by the following Formula (A) and an ether-based plasticizer containing a polyether represented by the following Formula (B).

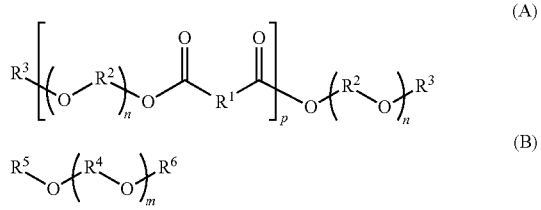

In Formula (A), $R^1$ represents a divalent aliphatic hydrocarbon group having 2 to 10 carbon atoms, $R^2$ each independently represents a divalent aliphatic hydrocarbon group having 2 to 6 carbon atoms, $R^3$ each independently represents a hydrogen atom, an alkyl group having 1 to 20 carbon atoms, an aryl group having 6 to 20 carbon atoms, or an acyl group having 2 to 20 carbon atoms, n each independently represents an integer of 1 to 20, p represents an integer of 1 to 15, and a plurality of $R^1$'s, $R^2$'s, and n's contained in a repeating unit may be the same as or different to each other.

In Formula (B), $R^4$ represents a divalent aliphatic hydrocarbon group having 2 to 6 carbon atoms, $R^5$ and $R^6$ each independently represents a hydrogen atom, an alkyl group having 1 to 20 carbon atoms, an aryl group having 6 to 20 carbon atoms, an acyl group having 2 to 20 carbon atoms, a (meth)acryloyl group, or a group represented by the following Formula (b) obtained by polymerization of a (meth) acryloyl group, m represents an integer of 1 to 20, and a plurality of $R^4$'s contained in a repeating unit may be the same as or different to each other.

In the present specification, a "(meth)acryloyl group" means an acryloyl group ($CH_2=CHCO-$) or a methacryloyl group ($CH_2=C(CH_3)CO-$).

In Formula (b), * represents an oxygen atom bonded to $R^5$ or $R^6$ in Formula (B), $R^7$ represents a hydrogen atom or a methyl group, q represents an integer of 1 to 10, and a plurality of $R^7$'s contained in a repeating unit may be the same as or different to each other.

In the first aspect of the present invention, in a case where the film for an agricultural greenhouse contains a plasticizer, the content of the plasticizer, with respect to 100 parts by mass of the cellulose acylate resin, is preferably 10 to 70 parts by mass, more preferably 20 to 60 parts by mass, even more preferably 30 to 60 parts by mass, and particularly preferably 40 to 60 parts by mass.

As the matting agent, any one of organic and inorganic particles can be used.

Specific examples of the deterioration preventing agent include a hindered amine-based light stabilizer, an antioxidant, a peroxide decomposer, a radical inhibitor, a metal deactivator, an acid acceptor, an amine, and the like.

The ultraviolet absorbent can absorb ultraviolet rays, and known ultraviolet absorbents can be used. Examples thereof suitably include ultraviolet absorbents based on benzotriazole or hydroxyphenyltriazine.

In a case where these additives are added, it is preferable to incorporate the additives into a cellulose acylate solution (dope) which will be described later.

The equilibrium moisture content of the film for an agricultural greenhouse according to the first aspect of the present invention is 4% to 8%. It is preferable that the equilibrium moisture content is 5% to 8% because then the $CO_2$ concentration can be easily maintained.

The thickness of the film for an agricultural greenhouse according to the first aspect of the present invention is 60 µm to 200 µm. The thickness is preferably 80 µm to 150 µm and more preferably 80 µm to 120 µm, because then the workability can be improved.

The film for an agricultural greenhouse may have a single layered structure or a laminated structure, but it is preferable that the film has a single layered structure.

The light transmittance of the film for an agricultural greenhouse according to the first aspect of the present invention is preferably equal to or higher than 80%, more preferably equal to or higher than 85%, and even more preferably equal to or higher than 90%, because then the photosynthesis of plants in the greenhouse can be accelerated, and the internal temperature of the greenhouse can be suitably maintained.

Herein, the light transmittance refers to a transmittance measured using a spectrophotometer (manufactured by Jasco Engineering and Sales, Inc.: V-560) and represented by the calculated average regarding a wavelength region (400 to 700 nm) effective for photosynthesis.

The water vapor permeability of the film for an agricultural greenhouse according to the first aspect of the present invention is preferably equal to or higher than 600 g/m²/24 h, more preferably equal to or higher than 800 g/m²/24 h, and even more preferably equal to or higher than 1,000 g/m²/24 h, because then the occurrence of dew condensation in the agricultural greenhouse can be effectively inhibited, the internal relative humidity of the greenhouse in the mist can be reduced, and the mist cooling effect can be maintained.

Herein, the water vapor permeability refers to the amount of water vapor (g/m²/24 h), which passes through the film for 24 hours under the conditions of a temperature of 40° C. and a relative humidity of 90%, measured according to the technique described in JIS Z 0208:1976 "Testing methods for determination of the water vapor permeability (cup method) of moisture-proof packing materials".

<Method for Manufacturing Film for an Agricultural Greenhouse>

The method for manufacturing the film for an agricultural greenhouse according to the first aspect of the present invention is not particularly limited. Examples of the method include a solution film-forming method in which a dope (cellulose acylate solution) obtained by dissolving cellulose acylate in an organic solvent is cast from a casting die onto a support formed of an endless belt or a drum (hereinafter, these will be collectively simply referred to as a "support") rotating in a casing, and the dope is peeled from the support and dried so as to form a film.

(Organic Solvent)

Examples of the organic solvent dissolving the cellulose acylate include a hydrocarbon-based solvent such as benzene or toluene; a halogenated hydrocarbon-based solvent such as methylene chloride or chlorobenzene; an alcohol-based solvent such as methanol, ethanol, or diethylene glycol; a ketone-based solvent such as acetone; an ester-based solvent such as methyl acetate, ethyl acetate, or propyl acetate; an ether-based solvent such as tetrahydrofuran or methyl cellosolve; and the like. One kind of these may be used singly, or two or more kinds thereof may be used in combination.

Among these, a halogenated hydrocarbon-based solvent having 1 to 7 carbon atoms is preferably used, and methylene chloride is more preferably used.

From the viewpoint of the solubility of the cellulose acylate, the property of peeling the dope from the support, the mechanical strength of the film, and the like, it is preferable to use an alcohol having 1 to 5 carbon atoms in combination with methylene chloride. The content of the alcohol is preferably 2% to 25% by mass and more preferably 5% to 20% by mass with respect to the total amount of the solvent. Specific examples of the alcohol include methanol, ethanol, n-propanol, isopropanol, n-butanol, and the like. Among these, methanol, ethanol, n-butanol, or a mixture of these is preferably used.

(Preparation of Cellulose Acylate Solution)

The method for preparing a cellulose acylate solution is preferably a preparation method in which, first, cellulose acylate and an organic solvent are mixed together, the cellulose acylate is dissolved at −10° C. to 55° C., and the mixture of the dissolved portion of the cellulose acylate, an undissolved portion of the cellulose acylate, and the organic solvent is heated to 0° C. to 97° C. such that the cellulose acylate completely dissolves in the solvent.

Herein, if necessary, the cellulose acylate solution to be prepared may be concentrated, and the concentration of the cellulose acylate is preferably 5% to 40% by mass. Furthermore, the viscosity of the cellulose acylate solution measured at 40° C. is preferably 10 to 3,000 Pa·s.

When the cellulose acylate and the organic solvent are mixed together, 90% by mass or more of the cellulose acylate is preferably used in the form of particles having a size of 0.1 to 4 mm.

It is preferable that the cellulose acylate solution is filtered at a temperature of 0° C. to 200° C. before casting.

Herein, the average pore size of the filter is preferably equal to or less than 100 μm, and the flow rate for the filtration is preferably equal to or higher than 50 L/hr.

(Casting)

In the step of casting the cellulose acylate solution, the temperature of the solution is preferably −10° C. to 57° C. During this step, the temperature is preferably kept at −10° C. to 57° C.

The surface temperature of the support onto which the cellulose acylate solution is cast is preferably −20° C. to 40° C.

(Peeling)

During peeling following casting, the temperature of the drying air at the time of peeling is preferably 20° C. to 250° C. Furthermore, the film for an agricultural greenhouse that has not yet been dried at the time of drying is held by a tenter.

It is preferable that the film for an agricultural greenhouse prepared by the solution film-forming method described above is stretched 0.5% to 300% during uniaxial casting or after casting. Furthermore, the rate at the time of casting is preferably 1 to 200 m/min.

It is preferable that the film for an agricultural greenhouse is wound such that the lengths of the film in a longitudinal direction and a width direction become equal to or greater than 100 m and equal to or greater than 60 cm respectively.

In the present invention, the aforementioned method for manufacturing a cellulose acylate film is not particularly limited, and known methods other than the aforementioned method can be appropriately adopted. For example, it is possible to appropriately adopt the method described in pages 12 to 30 of the technical report from Japanese Institute of Invention and Innovation (open technique No. 2001-1745, published on Mar. 15, 2001, Japanese Institute of Inventions and Innovation).

[Agricultural Greenhouse (First Aspect)]

The agricultural greenhouse according to the first aspect of the present invention is an agricultural greenhouse having a frame and a film, in which a space walled off from the outside is formed by spreading the film over the frame.

FIG. 1 is a schematic perspective view showing an example of the exterior of the agricultural greenhouse according to the first aspect of the present invention.

As shown in FIG. 1, an agricultural greenhouse 10 has a film 1 spread over a frame 2.

Figure 4:
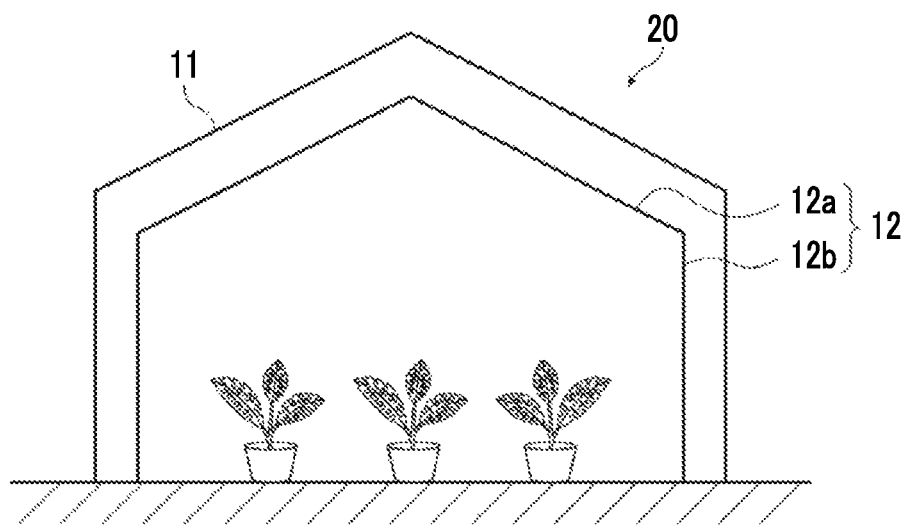
FIG. 4 is a schematic cross-sectional view showing an example of the interior of the agricultural greenhouse according to the third aspect.

Furthermore, as shown in FIG. 1, the entire surface of the agricultural greenhouse 10 is covered with the film 1 spread over the frame 2, and the agricultural greenhouse 10 does not have the exhaust fan illustrated in FIG. 4 or the like of JP2010-17093A.

Hereinafter, the frame and the film constituting the agricultural greenhouse according to the first aspect of the present invention will be specifically described.

[Frame]

The frame that the agricultural greenhouse according to the first aspect of the present invention has is not particularly limited, and it is possible to use frameworks (for example, steel or steel pipes) used in a plastic greenhouse and the like known in the related art.

[Film]

The film that the agricultural greenhouse according to the first aspect of the present invention has is a film that is spread over the aforementioned frame and is the aforementioned film for an agricultural greenhouse according to the first aspect of the present invention.

The agricultural greenhouse according to the first aspect of the present invention has the aforementioned film for an agricultural greenhouse according to the first aspect of the present invention. Therefore, the agricultural greenhouse can maintain a $CO_2$ concentration necessary for the photosynthesis of plants even if ventilation is not performed.

Consequently, the agricultural greenhouse according to the first aspect of the present invention does not need to be provided with active ventilation means (for example, a ventilation fan provided on the ceiling or the lateral surface of a greenhouse), has an excellent air conditioning efficiency, and has an effect of being able to inhibit the inflow of pests.

In the present invention, although the ventilation means does not include an entrance for the workers working in the agricultural greenhouse, it is preferable that the entrance is made into a double door such that the external air does not directly flow into the internal space of the greenhouse.

[Agricultural Greenhouse (Second Aspect)]

The agricultural greenhouse according to the second aspect of the present invention is an agricultural greenhouse having a frame and a film, in which a space walled off from the outside is formed by spreading the film over the frame.

The film is a cellulose film which contains a cellulose acylate resin and has a water vapor permeability equal to or higher than 600 g/m$^2$/24 h and a thickness of 80 to 200 µm.

The agricultural greenhouse according to the second aspect of the present invention also has a spray device that sprays atomized water into the space.

Figure 2:
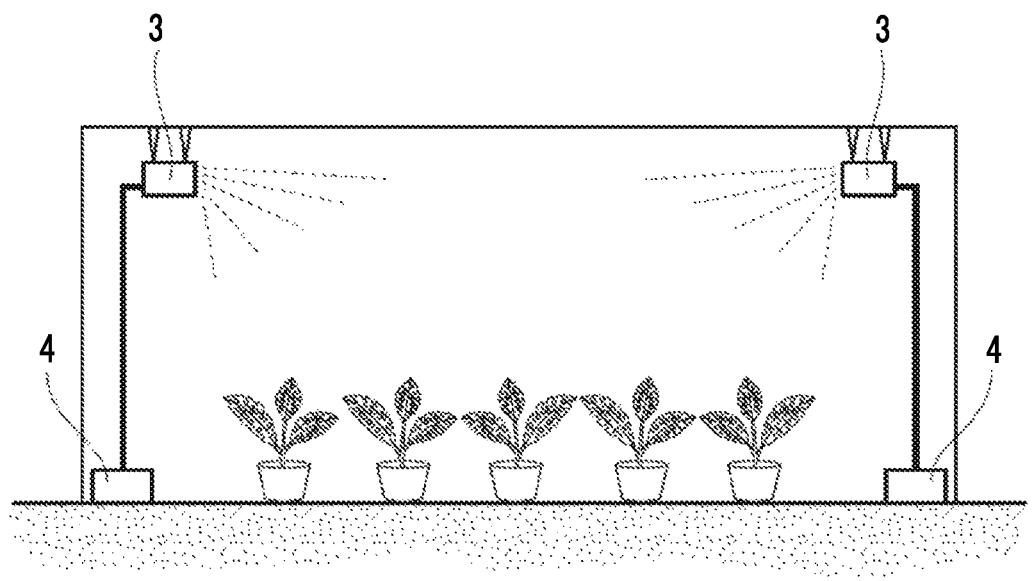
FIG. 2 is a schematic cross-sectional view showing an example of the interior of the agricultural greenhouse according to the second aspect of the present invention.

FIG. 1 is a schematic perspective view showing an example of the exterior of the agricultural greenhouse according to the second aspect of the present invention. FIG. 2 is a schematic cross-sectional view showing an example of the interior of the agricultural greenhouse according to the second aspect of the present invention.

As shown in FIGS. 1 and 2, the agricultural greenhouse 10 has the film 1 spread over the frame 2, a spray device 3 spraying atomized water into the space of the greenhouse, and a water supply tank 4.

Furthermore, as shown in FIGS. 1 and 2, the entire surface of the agricultural greenhouse 10 is covered with the film 1 spread over the frame 2, and the agricultural greenhouse 10 does not have the intake fan or the exhaust fan illustrated in FIG. 1 or the like of JP2014-198035A.

The agricultural greenhouse according to the second aspect of the present invention is constituted as above. Particularly, the agricultural greenhouse is constituted with the film which contains a cellulose acylate resin and has a water vapor permeability equal to or greater than 600 g/m$^2$/24 h and a thickness of 80 to 200 µm. Therefore, even if the greenhouse is cooled using the spray device, ventilation means is not required, and the inflow of pests can be inhibited.

The details of the reason why the aforementioned effects are brought about are unclear. Presumably, by setting the water vapor permeability and the thickness of the film to be within the aforementioned range of numerical values, at least a portion of the water sprayed from the spray device may slowly pass through the film toward the outside, the internal humidity of the agricultural greenhouse may be decreased, and hence the aforementioned effects may be obtained.

Hereinafter, the frame, the film, and the spray device constituting the agricultural greenhouse according to the second aspect of the present invention will be specifically described.

[Frame]

The frame that the agricultural greenhouse according to the second aspect of the present invention has is not particularly limited, and it is possible to use frameworks (for example, steel or steel pipes) used in a plastic greenhouse and the like known in the related art.

[Film]

The film that the agricultural greenhouse according to the second aspect of the present invention has (hereinafter, referred to as a "film for an agricultural greenhouse according to the second aspect" as well) is a film spread over the aforementioned frame. The film is a cellulose film which contains a cellulose acylate resin and has a water vapor permeability equal to or higher than 600 g/m$^2$/24 h and a thickness of 80 to 200 µm.

Herein, the water vapor permeability has the same definition as the water vapor permeability described for the film for an agricultural greenhouse according to the first aspect of the present invention.

<Cellulose Acylate Resin>

The cellulose acylate resin contained in the film for an agricultural greenhouse according to the second aspect is not particularly limited, and examples thereof are the same as the examples of the cellulose acylate resins contained in the film for an agricultural greenhouse according to the first aspect of the present invention.

<Additives>

Depending on the usage environment, the film for an agricultural greenhouse according to the second aspect may contain additives such as a plasticizer, a matting agent, a deterioration preventing agent, and an ultraviolet absorbent.

Examples of the additives are the same as the examples of the additives described above for the film for an agricultural greenhouse according to the first aspect of the present invention.

The thickness of the film for an agricultural greenhouse according to the second aspect is 80 µm to 200 µm. The thickness is preferably 80 µm to 150 µm and more preferably 80 µm to 120 µm, because then the workability can be further improved.

The film for an agricultural greenhouse according to the second aspect may have a single layered structure or a laminated structure, but it is preferable that the film has a single layered structure.

<Method for Manufacturing Film for Agricultural Greenhouse>

The method for manufacturing the film for an agricultural greenhouse according to the second aspect is not particularly limited, and examples of the method are the same as the examples of the method described above for the film for an agricultural greenhouse according to the first aspect of the present invention.

[Spray Device]

The spray device that the film for an agricultural greenhouse according to the second aspect has is a device spraying atomized water into the space of the greenhouse.

As will be described later, the spray device is preferably a mist cooling device that cools the space by spraying atomized water into the space of the greenhouse. Examples of the spray device include the mist cooling device, which will be described later, a device used for supplying water to the plants in a greenhouse, and the like.

<Mist Cooling Device>

The mist cooling device is also referred to as a mist cooling fan, and for example, it is possible to use a known device such as a mist fan, a mist cooler, or the like.

Specific examples of the mist cooling device include the "mist cooling device controlling the growth of crops that is constituted with a fan sending air and spray means for sending mist to the fan" described in JP2010-068740A, the "device which can spray water into a space by using an air atomizing-type nozzle atomizing a liquid by using pressurized air" described in JP2000-157068A, and the like.

In FIG. 2, the water supply tank 4 is installed in the agricultural greenhouse. However, in the present invention, only the means for spraying atomized water into the space in the greenhouse (for example, a blast fan or a nozzle) may be installed in the agricultural greenhouse.

<Spray Amount>

In the second aspect of the present invention, the spray amount of the spray device is preferably 5 to 30 g/m²·min and more preferably 10 to 20 g/m²·min, because then a sufficient cooling effect can be obtained even in the daytime during the summer season, and the occurrence of dew condensation can be further inhibited.

The agricultural greenhouse according to the second aspect of the present invention has the aforementioned film for an agricultural greenhouse according to the second aspect. Therefore, the agricultural greenhouse does not require ventilation means and can inhibit the inflow of pests.

Accordingly, the agricultural greenhouse according to the second aspect of the present invention does not need to be provided with active ventilation means (for example, a ventilation fan provided on the ceiling or the lateral surface of a greenhouse). However, it is preferable that the agricultural greenhouse does not have ventilation means, because then the inflow of pests can further be inhibited, and the environment necessary for the growth of plants can be easily created. In the present invention, although the ventilation means does not include an entrance for the workers working in the agricultural greenhouse, it is preferable that the entrance is made into a double door such that the external air does not directly flow into the greenhouse.

The agricultural greenhouse according to the second aspect of the present invention has the aforementioned film for an agricultural greenhouse. Consequently, as will be shown in FIG. 7 which will be described later, the carbon dioxide concentration in the greenhouse can be kept to be the same as the carbon dioxide concentration of the external air. Therefore, it is not necessary to perform an operation of blowing carbon dioxide necessary for the photosynthesis of plants into the greenhouse from the outside.

[Agricultural Greenhouse (Third Aspect)]

The agricultural greenhouse according to the third aspect of the present invention has a covering film which forms a space walled off from the outside, a lining film which is provided on the inside of the covering film such that an interspace is formed between the covering film and the lining film, and ventilation means for exchanging at least a portion of the air existing in the interspace with the external air. In the present invention, as will be described later, a portion of the covering film may include the ventilation means, or the entirety of the covering film may include the ventilation means.

At least a portion of the lining film in the agricultural greenhouse according to the third aspect of the present invention is a film constituted with a cellulose film which contains a cellulose acylate resin and has a water vapor permeability equal to or higher than 600 g/m²/24 h.

Figure 3:
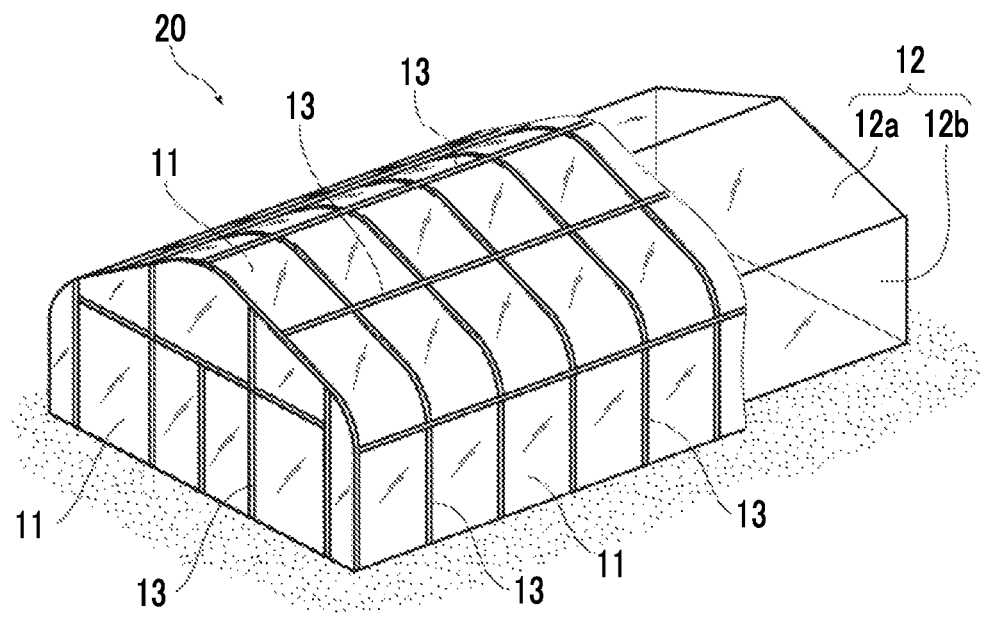
FIG. 3 is a schematic perspective view showing an example of the exterior of an agricultural greenhouse according to the third aspect of the present invention except for a portion of the agricultural greenhouse.
Figure 5:
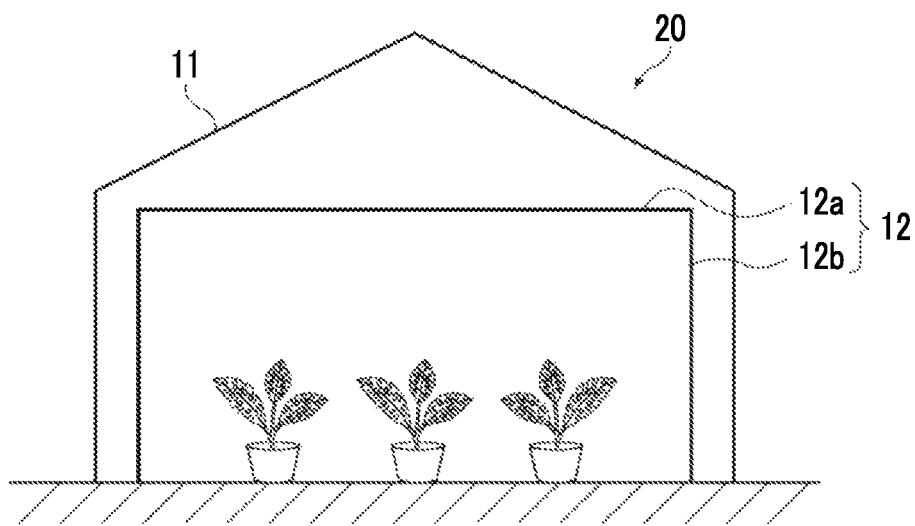
FIG. 5 is a schematic cross-sectional view showing an example of the interior of the agricultural greenhouse according to the third aspect.
Figure 6:
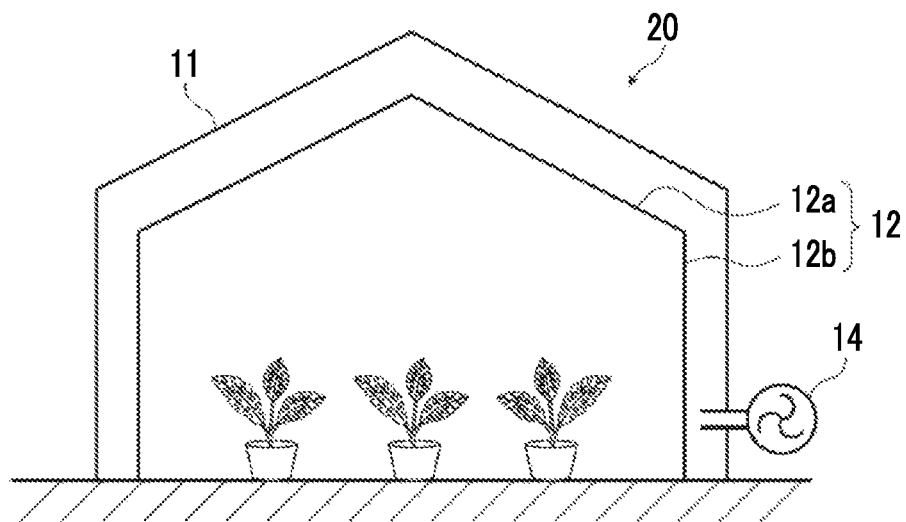
FIG. 6 is a schematic cross-sectional view showing an example of the interior of the agricultural greenhouse according to the third aspect.

FIG. 3 is a schematic perspective view showing an example of the exterior of the agricultural greenhouse according to the third aspect of the present invention except for a portion of the agricultural greenhouse. FIGS. 4 to 6 are schematic cross-sectional views showing an example of the interior of the agricultural greenhouse of the present invention.

As shown in FIGS. 3 to 6, an agricultural greenhouse 20 has a covering film 11 and a lining film 12 (reference 12a: roof portion, reference 12b: wall surface portion).

As shown in FIG. 3, the covering film 11 preferably has an aspect in which the film is spread over a frame 13.

Although the agricultural greenhouse 20 shown in FIGS. 3 to 5 shows an aspect in which at least a portion of the covering film 11 functions as ventilation means as well, as shown in FIG. 6, a ventilation fan 14 constituted as a member separated from the covering film 11 may be provided.

The agricultural greenhouse according to the third aspect of the present invention is constituted as above. Particularly, the agricultural greenhouse uses the cellulose film, which contains a cellulose acylate resin and has a water vapor permeability equal to or higher than 600 g/m²/24 h, as the lining film and is provided with the ventilation means for exchanging the air existing in the interspace between the lining film and the covering film. Therefore, the dew condensation occurring on the inside of the lining film can be inhibited, and the light transmittance of the agricultural greenhouse can be increased.

The details of the reason why the aforementioned effects are brought about are unclear, but are assumed to be as below according to the inventors of the present invention.

First, in the gas-permeable sheet described in JP2011-10590A in which micropores are formed, the water vapor permeability is improved due to the existence of the pores, and accordingly, the effect of reducing the internal humidity of an agricultural greenhouse is obtained. However, presumably, once the dew condensation occurs, the pores may be clogged due to the dew condensation, and hence the moisture permeability may be impaired. Furthermore, presumably, due to the dew condensation or the existence of the pores, the light transmittance may be reduced.

In contrast, in the third aspect of the present invention, the cellulose film contains the cellulose acylate resin, and hence the hydrophilicity is improved, and the hygroscopicity of the lining film is enhanced. Furthermore, because the water vapor permeability is equal to or higher than 600 g/m²/24 h, the in-plane distribution of the water vapor permeability within the lining film substantially disappears. As a result, the occurrence of dew condensation can be completely inhibited, or the dew condensation that has occurred can be efficiently resolved. Presumably, for the above reason, the dew condensation occurring on the inside of the lining film can be inhibited, and the light transmittance of the agricultural greenhouse can be increased.

Hereinafter, the lining film, the covering film, and the ventilation means constituting the agricultural greenhouse according to the third aspect of the present invention will be specifically described.

[Lining Film]

The lining film that the agricultural greenhouse according to the third aspect of the present invention has is a film which is provided on the inside of the covering film, which will be described later, such that an interspace is formed between the covering film and the lining film. The lining film is a film in which at least a portion thereof is constituted with a cellulose film which contains a cellulose acylate resin and has a water vapor permeability equal to or higher than 600 g/m²/24 h.

Herein, the water vapor permeability has the same definition as the water vapor permeability described above for the film for an agricultural greenhouse according to the first aspect of the present invention.

<Cellulose Acylate Resin>

The cellulose acylate resin contained in the cellulose film is not particularly limited, and examples thereof are the same as the examples of the cellulose acylate resin contained in the film for an agricultural greenhouse according to the first aspect of the present invention.

<Additives>

Depending on the usage environment, the cellulose film may contain additives such as a plasticizer, a matting agent, a deterioration preventing agent, and an ultraviolet absorbent.

Examples of these additives are the same as the examples of the additives described above for the film for an agricultural greenhouse according to the first aspect of the present invention.

<Method for Manufacturing Cellulose Film>

The method for manufacturing the cellulose film is not particularly limited, and examples of the method are the same as the examples of the method described above for the film for an agricultural greenhouse according to the first aspect of the present invention.

In the third aspect of the present invention, it is preferable that the roof portion of the lining film is constituted with the aforementioned cellulose film, because the growth failure of plants that occurs due to the dripping of dews can then be prevented. It is more preferable that both the roof portion and the wall surface portion of the lining film are constituted with the cellulose film.

Herein, the roof portion of the lining film refers to the upper portion of the space where plants grow, that is, the portion positioned in a direction perpendicular to the soil or the like in which plants are placed. The roof portion refers to the portion indicated by the reference 12a in FIGS. 3 to 6.

The wall surface portion of the lining film refers to the lateral portion of the space in which plants grow, that is, the portion positioned in a direction horizontal to the soil or the like in which plants are placed. The wall surface portion refers to the portion indicated by the reference 12b in FIGS. 3 to 6.

The thickness of the lining film is preferably 60 μm to 200 μm, more preferably 80 μm to 150 μm, and even more preferably 80 μm to 120 μm, because then the workability can be improved.

The lining film may have a single layered structure or a laminated structure, but it is preferable that the film has a single layered structure.

[Covering Film]

The covering film that the agricultural greenhouse according to the third aspect of the present invention has is a film forming a space walled off from the outside.

The covering film is not particularly limited, and examples of the constituent material thereof include polyethylene terephthalate, polybutylene terephthalate, polycarbonate, polyethylene, an acrylic resin, polyvinyl chloride, polyvinyl alcohol, a cellulose acylate resin, a fluorine-containing resin, and the like.

In the third aspect of the present invention, it is preferable that at least a portion of the covering film includes ventilation means which will be described later, and that the ventilation means is a film having a water vapor permeability equal to or higher than 500 g/m$^2$/24 h, because then the moisture permeability can be retained, and the occurrence of dew condensation can be further inhibited.

Herein, "at least a portion of the covering film includes ventilation means which will be described later" means that at least a portion of the covering film has a function of exchanging at least a portion of the air existing in the interspace between the covering film and the lining film with the external air. In this case, the agricultural greenhouse may not have ventilation means (for example, the ventilation fan 14 shown in FIG. 6) constituted as a member separated from the covering film.

Furthermore, "the entirety of the covering film includes the ventilation means which will be described later" means that the entirety of the covering film has a function of exchanging at least a portion of the air existing in the interspace between the covering film and the lining film with the external air. In this case, the covering film and the ventilation means may be constituted with the same member.

Examples of the aforementioned film having a water vapor permeability equal to or higher than 500 g/m$^2$/24 h include the agricultural film described in JP2007-089493A, the cellulose film described above as the lining film, and the like.

Among these, the cellulose film which contains a cellulose acylate resin and has a water vapor permeability equal to or higher than 600 g/m$^2$/24 h is preferable, because water droplets resulting from rain does not infiltrate into such film, and the light transmittance can be further increased.

[Ventilation Means]

The ventilation means that the agricultural greenhouse according to the third aspect of the present invention has is means for exchanging at least a portion of the air existing in the interspace between the aforementioned covering film and the lining film with the external air.

As described above, the ventilation means has an aspect in which the ventilation portion is provided in at least a portion of the covering film. That is, examples of the ventilation means include a film having a water vapor permeability equal to or higher than 500 g/m$^2$/24 h, a member constituted as a unit (for example, a ventilation fan or a ventilation hole) separated from the covering film, and the like.

[Frame]

The agricultural greenhouse according to the third aspect of the present invention may have a frame over which the aforementioned covering film and lining film (particularly, the covering film) is spread.

Herein, the frame is not particularly limited, and it is possible to use frameworks (for example, steel or steel pipes) used in a plastic greenhouse and the like known in the related art.

In the third aspect of the present invention, the method for installing the aforementioned lining film on the inside of the aforementioned covering film is not particularly limited. Examples of the method include a method in which an agricultural greenhouse is prepared using the covering film and the frame, and then a small-sized agricultural greenhouse is prepared within the space of the aforementioned agricultural greenhouse by using the lining film and the frame; a method in which an agricultural greenhouse is prepared using the covering film and the frame, a curtain rail or a wire is then installed in the vicinity of the boundary between the roof portion and the wall surface portion of the agricultural greenhouse, and the lining film is installed on these; and the like.

It is preferable that the lining film is made movable by being installed on a curtain rail or the like such that the lining film can be installed during the night time or in the morning during which the external temperature drops.

At the time of installing the lining film, the interspace between the lining film and the covering film does not need to be uniform. For example, as shown in FIG. 5, the lining film may be installed such that only the roof portion of the lining film becomes horizontal.

[Film for an Agricultural Greenhouse (Fourth Aspect)]

The film for an agricultural greenhouse according to the fourth aspect of the present invention is a film for an agricultural greenhouse which contains a cellulose acylate resin and a plasticizer containing a polyether ester and/or a polyether as an optional component and has a water vapor permeability equal to or higher than 600 g/m²/24 h and a modulus of elasticity less than 3.0 GPa.

Herein, the film for an agricultural greenhouse refers to a film covering the frame (steel pipe) of a small house called a plastic greenhouse (greenhouse). The film for an agricultural greenhouse is an agricultural mulching film, that is, a film different from the film which covers the surface of the soil for preventing the field from drying (surface of the ground) or suppressing weeds.

The water vapor permeability has the same definition as the water vapor permeability described above for the film for an agricultural greenhouse according to the first aspect of the present invention.

Regarding the modulus of elasticity, a total of eight samples having a length of 150 mm in a measurement direction and a width of 15 mm are prepared by varying the orientation of cutting in the measurement direction by 45°, and the average of elastic moduli calculated for each of the samples is calculated and taken as the modulus of elasticity. For calculating the modulus of elasticity of each sample, each sample was left as it was for 24 hours in an environment with a temperature of 25° C. and a relative humidity of 60% and then immediately stretched at an inter-chuck distance of 100 mm and a tensile rate of 200 mm/min in the atmosphere with a temperature of 25° C. and a relative humidity of 60% by using a tensile tester "STROGRAPH" manufactured by A&D Company, Limited; the stress applied at the time when the sample was stretched by 0.1% and at the time when the sample was stretched by 0.5% was measured; and from the slope thereof, the modulus of elasticity was calculated.

In the fourth aspect of the present invention, by using the film which contains a cellulose acylate resin, has a water vapor permeability equal to or higher than 600 g/m²/24 h and a modulus of elasticity of less than 3.0 GPa, both the drip-proofness and the workability can be improved.

Hereinafter, the cellulose acylate resin and a predetermined plasticizer will be specifically described.

<Cellulose Acylate Resin>

The cellulose acylate resin contained in the film for an agricultural greenhouse according to the fourth aspect of the present invention is not particularly limited, and examples of the resin are the same as the examples of the cellulose acylate resin contained in the film for an agricultural greenhouse according to the first aspect of the present invention.

<Plasticizer>

It is preferable that the film for an agricultural greenhouse according to the fourth aspect of the present invention contains a plasticizer containing a polyether ester and/or a polyether, because the drip-proofness and the workability of the obtained film for an agricultural greenhouse according to the fourth aspect of the present invention can then be further improved, and the dew condensation can be prevented even when a highly humid environment has been created in the greenhouse. The plasticizer may contain a plasticizer component other than a polyether ester and a polyether, or may be a plasticizer composed only of a polyether ester and/or a polyether.

It is considered that the addition of the plasticizer may further reduce the modulus of elasticity of the film, improve the moisture content of the film, and make it easy for the water vapor to enter the greenhouse.

(Polyether Ester)

Examples of the polyether ester suitably include a polyether ester represented by the following Formula (A).

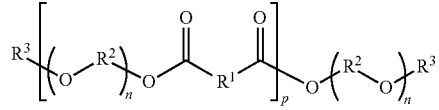

In Formula (A), $R^1$ represents a divalent aliphatic hydrocarbon group having 2 to 10 carbon atoms, $R^2$ each independently represents a divalent aliphatic hydrocarbon group having 2 to 6 carbon atoms, $R^3$ each independently represents a hydrogen atom, an alkyl group having 1 to 20 carbon atoms, an aryl group having 6 to 20 carbon atoms, or an acyl group having 2 to 20 carbon atoms, n each independently represents an integer of 1 to 20, and p represents an integer of 1 to 15.

A plurality of $R^1$'s, $R^2$'s, and n's contained in a repeating unit may be the same as or different to each other.

The divalent aliphatic hydrocarbon group having 2 to 10 carbon atoms that is represented by $R^1$ in Formula (A) may be saturated or unsaturated, and may be any one of a divalent chain-like and cyclic aliphatic hydrocarbon groups (for example, a cycloalkylene group).

In a case where the divalent aliphatic hydrocarbon group is a divalent chain-like aliphatic hydrocarbon group, the group may be linear or branched, and preferred examples thereof include ethylene, trimethylene, tetramethylene, pentamethylene, hexamethylene, heptamethylene, octamethylene, nonamethylene, decamethylene, propylene, 1,2-dimethylethylene, 1-methyltrimethylene, 2-methyltrimethylene, 2-methyltetramethylene, 2,2-dimethyltrimethylene, 1,2-cyclopentylene, 1,3-cyclopentylene, 1,2-cyclohexylene, 1,3-cyclohexylene, 1,4-cyclohexylene, and the like.

The number of carbon atoms in the divalent aliphatic hydrocarbon group is preferably 2 to 6, because then the modulus of elasticity of the film can further be reduced, and the workability can further be improved. The number of carbon atoms is more preferably 4 to 6, because then the proportion of the plasticizer eluted from the obtained film for an agricultural greenhouse due to water or the like (hereinafter, simply referred to as an "elution rate") can be reduced.

The divalent aliphatic hydrocarbon group having 2 to 6 carbon atoms that is represented by $R^2$ in Formula (A) is preferably a divalent linear aliphatic hydrocarbon group which may be linear or branched.

The number of carbon atoms of the divalent aliphatic hydrocarbon group is preferably 2 to 4, more preferably 2 or 3, and even more preferably 2.

The divalent aliphatic hydrocarbon group having 2 to 6 carbon atoms is preferably a chain-like alkylene group, and preferred examples thereof include ethylene, trimethylene, tetramethylene, pentamethylene, hexamethylene, propylene, 1-methyltrimethylene, 2-methyltrimethylene, 1,2-dimethylethylene, and 1-ethylethylene. Among these, ethylene, trimethylene, propylene, tetramethylene, and 1-ethylethylene are more preferable, ethylene, trimethylene, propylene, and tetramethylene are even more preferable, and ethylene or propylene is most preferable.

As described above, $R^3$ in Formula (A) represents a hydrogen atom, an alkyl group having 1 to 20 carbon atoms, an aryl group having 6 to 20 carbon atoms, or an acyl group having 2 to 20 carbon atoms.

Herein, the alkyl group having 1 to 20 carbon atoms that is represented by $R^3$ may be chain-like or cyclic. In a case where the alkyl group is a chain-like aliphatic group, it may be linear or branched and may have a substituent. The number of carbon atoms thereof is preferably 1 to 12, more preferably 1 to 8, even more preferably 1 to 4, and most preferably 1 or 2.

The aryl group having 6 to 20 carbon atoms that is represented by $R^3$ may have a substituent, and the number of carbon atoms of the aryl group is preferably 6 to 15, more preferably 6 to 10, and even more preferably 6 to 8.

The acyl group having 2 to 20 carbon atoms that is represented by $R^3$ may be an aliphatic acyl group or an aromatic acyl group, and these may have a substituent. In a case where the acyl group is an aliphatic acyl group, the number of carbon atoms thereof is preferably 2 to 18, more preferably 2 to 8, and even more preferably 2 to 4. In a case where the acyl group is an aromatic acyl group, the number of carbon atoms thereof is preferably 7 to 18, more preferably 7 to 12, even more preferably 7 to 10, and most preferably 7 or 8.

In the present invention, $R^3$ is preferably any one of a hydrogen atom, an alkyl group having 1 to 20 carbon atoms, and an aryl group having 6 to 20 carbon atoms, and more preferably a hydrogen atom or an alkyl group having 1 to 20 carbon atoms. $R^3$ is even more preferably an alkyl group having 1 to 20 carbon atoms, because then the modulus of elasticity of the film can be further reduced, and the workability can be further improved.

n in Formula (A) represents an integer of 1 to 20. n is preferably an integer of 1 to 15, more preferably an integer of 1 to 10, even more preferably an integer of 1 to 6, particularly preferably an integer of 2 to 6, and most preferably an integer of 2 to 4.

Similarly, p in Formula (A) represents an integer of 1 to 15. n is preferably an integer of 1 to 10, more preferably an integer of 1 to 5, even more preferably an integer of 1 to 3, and particularly preferably an integer of 1 or 2, because then the modulus of elasticity of the film can be further reduced. Herein, p in Formula (A) is preferably an integer of 2 to 15 and more preferably an integer of 2 to 10, because then the elution rate of the plasticizer can be reduced.

(Method for Preparing Polyether Ester)

The method for preparing the aforementioned polyether ester is not particularly limited. In a case where $R^3$ in Formula (A) is a hydrogen atom, for example, the polyether ester can be easily synthesized by a thermal melting condensation method performed by causing a polyesterification reaction, an ester exchange reaction between a diol and dicarboxylic acid by a common method, or an interfacial condensation method using an acid chloride of the above acids and glycols.

"Plasticizer, Theory and Application thereof" (Koichi Murai, SAIWAI SHOBO CO., LTD., first printing of first edition on Mar. 1, 1973) specifically describes polycondensed esters, and the compounds described in the document can also be used.

Specific examples of the dicarboxylic acid include oxalic acid, malonic acid, succinic acid, maleic acid, fumaric acid, glutaric acid, adipic acid, pimelic acid, suberic acid, 1,4-cyclohexane dicarboxylic acid, and the like. Among these, succinic acid, glutaric acid, adipic acid, and 1,4-cyclohexane dicarboxylic acid are more preferable, and succinic acid, glutaric acid, and adipic acid in which an aliphatic has 2 to 4 carbon atoms are even more preferable.

In a case where $R^3$ in Formula (A) is an alkyl group having 1 to 20 carbon atoms, an aryl group having 6 to 20 carbon atoms, or an acyl group having 2 to 20 carbon atoms, the compound represented by Formula (A) can be synthesized from a compound represented by the following Formula (a) and the aforementioned dicarboxylic acid by the aforementioned common method.

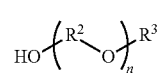

(a)

$R^2$, $R^3$, and n in Formula (a) have the same definitions as $R^2$, $R^3$, and n in Formula (A), and the preferred range thereof is also the same. In a case where the polyether ester is prepared from the aforementioned dicarboxylic acid and the compound represented by Formula (a), p in Formula (A) becomes 1.

In a case where $R^3$ in Formula (A) is an acyl group having 2 to 20 carbon atoms, for preparing the polyether ester, in addition to the aforementioned preparation method, it is possible to use a method of preparing a polyether ester in which $R^3$ represents a hydrogen atom by the aforementioned method and then introducing an acyl group into the polyether ester.

Herein, the introduction of the terminal acyl group can be performed by, for example, a method of causing dehydrocondensation with an alcohol by using carboxylic acid, a method of causing acylation of an alcohol by using a carboxylic anhydride or a carboxylic acid halide, a method of causing ester exchange by using a carboxylic acid ester, and the like.

Specific examples of the polyether ester represented by Formula (A) include polyether esters represented by Formula (A) in which $R^1$, $R^2$, $R^3$, n, and p are as described in the following Table 1.

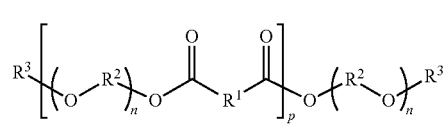

(A)

| | $R^1$ | $R^2$ | $R^3$ | n | p |
|---|---|---|---|---|---|
| HP-1 | Ethylene | Ethylene | Hydrogen atom | 1 | 1 |
| HP-2 | Ethylene | Ethylene | Hydrogen atom | 2 | 2 |
| HP-3 | Ethylene | Ethylene | Hydrogen atom | 2 | 3 |
| HP-4 | Ethylene | Ethylene | Hydrogen atom | 3 | 1 |
| HP-5 | Ethylene | Ethylene | Methyl | 2 | 1 |
| HP-6 | Ethylene | Ethylene | Methyl | 3 | 1 |
| HP-7 | Ethylene | Ethylene | Methyl | 4 | 1 |
| HP-8 | Ethylene | Ethylene | Butyl | 2 | 1 |
| HP-9 | Ethylene | Ethylene | Butyl | 3 | 1 |
| HP-10 | Ethylene | Ethylene | Octyl | 3 | 1 |
| HP-11 | Ethylene | Ethylene | Acetyl | 2 | 2 |
| HP-12 | Ethylene | Ethylene | Acetyl | 3 | 1 |
| HP-13 | Ethylene | Propylene | Hydrogen atom | 2 | 1 |
| HP-14 | Ethylene | Propylene | Hydrogen atom | 2 | 2 |
| HP-15 | Ethylene | Propylene | Hydrogen atom | 3 | 2 |
| HP-16 | Ethylene | Propylene | Methyl | 2 | 1 |
| HP-17 | Ethylene | Propylene | Butyl | 2 | 1 |
| HP-18 | Ethylene | Propylene | Acetyl | 2 | 2 |
| HP-19 | Ethylene | Tetramethylene | Benzoyl | 1 | 2 |
| HP-20 | Ethylene | Tetramethylene | Hydrogen atom | 3 | 2 |
| HP-21 | Trimethylene | Ethylene | Hydrogen atom | 2 | 2 |
| HP-22 | Trimethylene | Ethylene | Methyl | 3 | 1 |
| HP-23 | Trimethylene | Ethylene | Benzyl | 3 | 1 |
| HP-24 | Trimethylene | Ethylene | Acetyl | 3 | 3 |
| HP-25 | Tetramethylene | Ethylene | Hydrogen atom | 1 | 2 |
| HP-26 | Tetramethylene | Ethylene | Hydrogen atom | 2 | 2 |

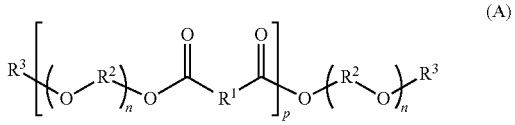

(A)

| | R¹ | R² | R³ | n | p |
|---|---|---|---|---|---|
| HP-27 | Tetramethylene | Ethylene | Hydrogen atom | 2 | 3 |
| HP-28 | Tetramethylene | Ethylene | Hydrogen atom | 3 | 1 |
| HP-29 | Tetramethylene | Ethylene | Hydrogen atom | 3 | 2 |
| HP-30 | Tetramethylene | Ethylene | Methyl | 3 | 1 |
| HP-31 | Tetramethylene | Ethylene | Methyl | 4 | 1 |
| HP-32 | Tetramethylene | Ethylene | Butyl | 2 | 1 |
| HP-33 | Tetramethylene | Ethylene | Butyl | 3 | 1 |
| HP-34 | Tetramethylene | Ethylene | Methyl | 3 | 2 |
| HP-35 | Tetramethylene | Ethylene | Acetyl | 4 | 2 |
| HP-36 | Tetramethylene | Propylene | Hydrogen atom | 2 | 2 |
| HP-37 | Tetramethylene | Propylene | Hydrogen atom | 3 | 2 |
| HP-38 | Tetramethylene | Propylene | Methyl | 2 | 1 |
| HP-39 | Tetramethylene | Propylene | Butyl | 2 | 1 |
| HP-40 | Tetramethylene | Propylene | Methyl | 3 | 1 |
| HP-41 | Tetramethylene | Propylene | Acetyl | 2 | 2 |
| HP-42 | Tetramethylene | Tetramethylene | Hydrogen atom | 3 | 1 |
| HP-43 | Pentamethylene | Ethylene | Hydrogen atom | 3 | 2 |
| HP-44 | Pentamethylene | Ethylene | Methyl | 3 | 1 |
| HP-45 | Pentamethylene | Ethylene | Butyl | 3 | 1 |
| HP-46 | Pentamethylene | Propylene | Hydrogen atom | 2 | 2 |
| HP-47 | Hexamethylene | Ethylene | Hydrogen atom | 2 | 2 |
| HP-48 | Hexamethylene | Ethylene | Methyl | 3 | 1 |
| HP-49 | Hexamethylene | Ethylene | Ethyl | 3 | 1 |
| HP-50 | Hexamethylene | Trimethylene | Acetyl | 1 | 2 |

(Polyether)

Examples of the polyether include a polyether represented by the following Formula (B).

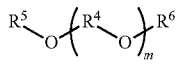

(B)

In Formula (B), $R^4$ represents a divalent aliphatic hydrocarbon group having 2 to 6 carbon atoms, $R^5$ and $R^6$ each independently represents a hydrogen atom, an alkyl group having 1 to 20 carbon atoms, an aryl group having 6 to 20 carbon atoms, an acyl group having 2 to 20 carbon atoms, a (meth)acryloyl group, or a group represented by the following Formula (b) obtained by polymerization of a (meth)acryloyl group, and m represents an integer of 1 to 20.

A plurality of $R^4$'s contained in a repeating unit may be the same as or different to each other.

In the present specification, a "(meth)acryloyl group" means an acryloyl group ($CH_2$=CHCO—) or a methacryloyl group ($CH_2$=C($CH_3$)CO—).

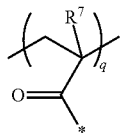

(b)

In Formula (b), * represents an oxygen atom bonded to $R^5$ or $R^6$ in Formula (B), $R^7$ represents a hydrogen atom or a methyl group, q represents an integer of 1 to 10, and a plurality of $R^7$'s contained in a repeating unit may be the same as or different to each other.

Examples of the divalent aliphatic hydrocarbon group having 2 to 6 carbon atoms that is represented by $R^4$ in Formula (B) are the same as the examples of $R^2$ in Formula (A).

As described above, $R^5$ and $R^6$ in Formula (B) represent a hydrogen atom, an alkyl group having 1 to 20 carbon atoms, an aryl group having 6 to 20 carbon atoms, an acyl group having 2 to 20 carbon atoms, a (meth)acryloyl group, or a group represented by Formula (b) obtained by the polymerization of a (meth)acryloyl group. Examples of functional groups other than a (meth)acryloyl group and a group represented by Formula (b) obtained by the polymerization of a (meth)acryloyl group are the same as the examples of $R^3$ in Formula (A).

Among these, the polyether in which $R^5$ is an aryl group (particularly, a phenyl group) having 6 to 20 carbon atoms or a (meth)acryloyl group is preferable, because the polyether can widen the internal space of the fiber of the cellulose acylate resin and can further increase the water vapor permeability of the obtained film for an agricultural greenhouse.

Furthermore, the polyether in which $R^6$ is a hydrogen atom is preferable, because the polyether can impart hydrophilicity to the cellulose acylate resin and can further increase the water vapor permeability of the obtained film for an agricultural greenhouse.

m in Formula (B) represents an integer of 1 to 20. m is preferably an integer of 1 to 15, more preferably an integer of 1 to 10, even more preferably an integer of 1 to 6, particularly preferably an integer of 2 to 6, and most preferably an integer of 2 to 4.

Specific examples of the polyether represented by Formula (B) include polyethylene glycol, polypropylene glycol, polytetramethylene glycol, and the like.

Examples of other polyethers represented by Formula (B) include polyethers obtained by repeating a reaction once or more times by which ring-opening addition of alkylene oxide (for example, ethylene oxide or propylene oxide), which contains ethylene oxide in at least a portion thereof, to phenols, hydroxyl group-containing (meth)acrylate, or the like occurs as illustrated in the synthesis examples among the examples that will be described later.

In the fourth aspect of the present invention, in a case where the film for an agricultural greenhouse contains a plasticizer, the content of the plasticizer, with respect to 100 parts by mass of the cellulose acylate resin, is preferably 10 to 70 parts by mass, more preferably 20 to 60 parts by mass, even more preferably 30 to 60 parts by mass, and particularly preferably 40 to 60 parts by mass.

<Additives>

Depending on the usage environment, the film for an agricultural greenhouse according to the fourth aspect of the present invention may contain additives such as a deterioration preventing agent and an ultraviolet absorbent.

Specific examples of the deterioration preventing agent include a hindered amine-based light stabilizer, an antioxidant, a peroxide decomposer, a radical inhibitor, a metal deactivator, an acid acceptor, an amine, and the like.

The ultraviolet absorbent can absorb ultraviolet rays, and any of known ultraviolet absorbents can be used. Examples thereof suitably include ultraviolet absorbents based on benzotriazole or hydroxyphenyltriazine.

In a case where the aforementioned deterioration preventing agent or ultraviolet absorbent is added, it is preferable to incorporate the additive into a cellulose acylate solution (dope), which will be described later, in an amount of 0.01% to 10% by mass.

<Matting Agent>

Depending on the usage environment, the film for an agricultural greenhouse according to the fourth aspect of the present invention may contain a matting agent.

As the matting agent, any one of organic and inorganic particles can be used.

Examples of the particles include silicon dioxide, titanium dioxide, aluminum oxide, zirconium oxide, calcium carbonate, talc, clay, fired kaolin, fired calcium silicate, hydrated calcium silicate, aluminum silicate, magnesium silicate, and calcium phosphate.

These particles form secondary particles which generally have an average particle size of 0.1 to 3.0 µm. These particles exist as an aggregate of primary particles in the film, and form irregularities having a size of 0.1 to 3.0 µm on the surface of the film. The average secondary particle size is preferably 0.2 µm to 1.5 µm, more preferably 0.4 µm to 1.2 µm, and most preferably 0.6 µm to 1.1 µm. In order to determine the primary and secondary particle sizes, the particles in the film were observed using a scanning electron microscope, and the diameters of circles circumscribed around the particles were used as the particle sizes. Furthermore, 200 particles were observed by changing spots, and the average thereof was taken as an average particle size.

The amount of particles added that is represented by a mass ratio, with respect to the cellulose acylate, is preferably 1 ppm to 5,000 ppm, more preferably 5 ppm to 1,000 ppm, and even more preferably 10 ppm to 500 ppm.

It is preferable that the particles contain silicon because the haze can then be controlled. Particularly, silicon dioxide is preferable. The silicon dioxide particles preferably have an average primary particle size equal to or less than 25 nm and an apparent specific gravity equal to or greater than 30 g/L. From the viewpoint of reducing the haze of the film, the average primary particle size is preferably as small as 5 to 20 nm. The apparent specific gravity is preferably equal to or greater than 90 to 200 g/L, and even more preferably equal to or greater than 100 to 200 g/L. It is preferable that the particles have high apparent specific gravity, because then a high-concentration dispersion can be prepared, and the haze and the aggregate can be ameliorated.

As the silicon dioxide particles, for example, it is possible to use commercially available products such as AEROSIL NX90S, R972, R972V, R974, R812, 200, 200V, 300, R202, OX50, and TT600 (all manufactured by NIPPON AEROSIL CO., LTD.). As zirconium oxide particles, for example, those marketed in the trade name of AEROSIL R976 and R811 (all manufactured by NIPPON AEROSIL CO., LTD.) can be used.

Among these, AEROSIL 200V and AEROSIL R972V are the silicon dioxide particles having an average primary particle size equal to or less than 20 nm and an apparent specific gravity equal to or greater than 70 g/L. These silicon dioxide particles are particularly preferable because they have a strong effect of reducing the frictional coefficient while keeping the haze of the film for an agricultural greenhouse at a low level.

The film for an agricultural greenhouse according to the fourth aspect of the present invention may have a single layered structure or a laminated structure, but it is preferable that the film has a single layered structure.

The thickness of the film for an agricultural greenhouse is preferably 60 µm to 200 µm, more preferably 60 µm to 150 µm, and even more preferably 80 µm to 120 µm, because then the workability of the obtained film for an agricultural greenhouse according to the fourth aspect of the present invention can be further improved.

<Method for Manufacturing Film for an Agricultural Greenhouse>

The method for manufacturing the film for an agricultural greenhouse according to the fourth aspect of the present invention is not particularly limited. Examples of the method are the same as the examples of the method described above for the film for an agricultural greenhouse according to the first aspect of the present invention.

In a case where the film for an agricultural greenhouse according to the fourth aspect of the present invention contains a plasticizer, the timing of blending the plasticizer is not particularly limited as long as the plasticizer is added at a point in time when cellulose acylate film is formed. For example, the plasticizer may be added at a point in time when cellulose acylate is synthesized [for example, the aforementioned precipitation step], or may be mixed with cellulose acylate at the time when dope is prepared as shown in examples which will be described later.

EXAMPLES

[First Aspect]

Hereinafter, the first aspect of the present invention will be more specifically described based on examples. The materials and the amount thereof used, the proportion of the materials, the treatment content, the treatment procedure, and the like shown in the following examples can be appropriately changed within a scope that does not depart from the gist of the present invention. Accordingly, the scope of the present invention is not limited to the following examples.

<Synthesis of Plasticizer>

By the following method, polyether esters were synthesized as ester-based plasticizers A to C used in Examples 1-2 and 1-3 and Comparative Example 1-1. Regarding each of the synthesized polyether esters, the number of polymerized monomers (n), the number of polymerized monomers (p), and the terminal ($R^3$) in Formula (A) are shown in the following Table 1.

(Plasticizer A—Used in Example 1-2)

Succinic acid and triethylene glycol were polyesterified by a thermal melting condensation method, thereby synthesizing a polyether ester.

(Plasticizer B—Used in Example 1-3)

Monoethylene glycol and tetraethylene glycol were added to adipic acid at a content ratio (monoethylene glycol:tetraethylene glycol) of 70/30 and polyesterified by a thermal melting condensation method, thereby synthesizing a polyether ester.

(Plasticizer C—Used in Comparative Example 1-1)

Adipic acid and monoethylene glycol were polyesterified by a thermal melting condensation method, thereby synthesizing a polyether ester.

TABLE 1

| | | Ester-based plasticizer | | | | | |
|---|---|---|---|---|---|---|---|
| | | Diol 1 | | Diol 2 | | | |
| No. | Dicarboxylic acid Type | Type | Number of polymerized monomers (n) | Type | Number of polymerized monomers (n) | Number of polymerized monomers (p) | Terminal ($R^3$) |
| A | Succinic acid | Triethylene glycol | 3 | — | — | 1 | Hydrogen atom |
| B | Adipic acid | Monoethylene glycol | 1 | Tetraethylene glycol | 4 | 9 | Hydrogen atom |
| C | Adipic acid | Monoethylene glycol | 1 | — | — | 5 | Hydrogen atom |

Example 1-1

<Preparation of Dope>

The following composition was put into a mixing tank and stirred such that each component dissolved, thereby preparing a cellulose acetate solution.

| | |
|---|---|
| Cellulose acylate (degree of acetyl group substitution: 2.86, viscosity average polymerization degree: 320) | 100 parts by mass |
| Silica particle dispersion (average particle size: 16 nm) "AEROSIL R972" manufactured by NIPPON AEROSIL CO., LTD | 1.3 parts by mass |
| Methylene chloride | 635 parts by mass |
| Methanol | 125 parts by mass |

<Formation of Film>

The dope whose temperature was adjusted to be 30° C. was uniformly cast on an endless stainless steel belt (support) such that the film thickness after drying became 120 μm.

Immediately after casting, the dope film (web) on the belt was dried by being exposed to hot air with a temperature of 100° C. Then, 120 seconds after casting, the film was peeled at a peeling tension of 150 N/m and dried while being transported by a large number of rolls at a transport tension of 100 N/m. The temperature of the endless stainless steel belt in the peeling portion was set to be 10° C. The amount of the residual solvent at the time of peeling was 100% by mass.

The film was dried by being transported for 5 minutes within a first drying zone set to be 80° C. and then for 10 minutes within a second drying zone set to be 120° C. After being dried, the film was wound into the form of a roll, thereby preparing a film having a film width of 1.5 m, a rolled length of 2,000 m, and a film thickness of 120 μm (in the following Table 2, described as "cellulose-based (unplasticized)"). The amount of the residual solvent at the time of winding was 0.3% by mass.

Example 1-2

A film having a film width of 1.5 m, a rolled length of 2,000 m, and a film thickness of 120 μm (in the following Table 2, described as "cellulose-based (plasticizer A)") was prepared by the same method as in Example 1-1, except that a dope obtained by further blending 60 parts by mass of the plasticizer A with the dope prepared in Example 1-1 was used.

Example 1-3

A film having a film width of 1.5 m, a rolled length of 2,000 m, and a film thickness of 120 μm (in the following Table 2, described as "cellulose-based (plasticizer B)") was prepared by the same method as in Example 1-1, except that a dope obtained by further blending 60 parts by mass of the plasticizer B with the dope prepared in Example 1-1 was used.

Example 1-4

A film having a film width of 1.5 m, a rolled length of 2,000 m, and a film thickness of 120 μm (in the following Table 2, described as "cellulose-based (unplasticized)") was prepared by the same method as in Example 1-1, except that "cellulose acylate (degree of acetyl group substitution: 2.86, viscosity average polymerization degree: 320)" in the dope prepared in Example 1-1 was changed to "cellulose acylate (degree of acetyl group substitution: 2.40, viscosity average polymerization degree: 320)".

Example 1-5

A film having a film width of 1.5 m, a rolled length of 2,000 m, and a film thickness of 120 μm (in the following Table 2, described as "cellulose-based (unplasticized)") was prepared by the same method as in Example 1-1, except that "cellulose acylate (degree of acetyl group substitution: 2.86, viscosity average polymerization degree: 320)" in the dope prepared in Example 1-1 was changed to "cellulose acylate (degree of acetyl group substitution: 2.95, viscosity average polymerization degree: 320)".

Comparative Example 1-1

A film having a film width of 1.5 m, a rolled length of 2,000 m, and a film thickness of 120 μm (in the following Table 2, described as "cellulose-based (plasticizer C)") was prepared by the same method as in Example 1-1, except that a dope obtained by further blending 15 parts by mass of the plasticizer C with the dope prepared in Example 1-1 was used.

Comparative Example 1-2

As a fluorine-based film, a product named "F-CLEAN (registered trademark) SHIZENKORYUTEKI" manufactured by AGC Green-Tech Co., Ltd was used.

Comparative Example 1-3

As a vinyl-based film, a product named "NOBI-ACE-MIRAI (registered trademark)" manufactured by Mitsubishi Plastics Agri Dream Co., Ltd was used.

For each of the prepared films or the commercially available films used, water vapor permeability, equilibrium moisture content, light transmittance, $CO_2$ permeability coefficient, and $CO_2$ permeability were measured and evaluated by the following methods. The results are shown in the following Table 2.

$1 \times 10^{-10}$ $cm^3 \cdot cm/(s \cdot cm^2 \cdot cmHg)$) measured under humid film conditions.

$$T \text{ (}CO_2 \text{ permeability)} = (CO_2 \text{ permeability coefficient} \times \text{surface area of film} \times \text{pressure difference})/\text{film thickness}$$

TABLE 2

| | Film | Thickness μm | Degree of acetyl group substitution | Water vapor permeability g/m²/24 h | Equilibrium moisture content % | Light transmittance % | $CO_2$ permeability coefficient $1 \times 10^{-10}$ $cm^3 \cdot cm/(s \cdot cm^2 \cdot cmHg)$ | | $CO_2$ permeability $cm^3/(s \cdot cm^2 \cdot cmHg)$ |
|---|---|---|---|---|---|---|---|---|---|
| | | | | | | | Dry film condition | Humid film condition | Humid film condition |
| Example 1-1 | Cellulose-based (unplasticized) | 120 | 2.86 | 1,000 | 5.22 | 93 | 11 | 800 | 6.7E−06 |
| Example 1-2 | Cellulose-based (plasticizer A) | 120 | 2.86 | 900 | 4.10 | 93 | 71 | 600 | 5.0E−06 |
| Example 1-3 | Cellulose-based (plasticizer B) | 120 | 2.86 | 1,200 | 4.34 | 93 | 75 | 870 | 7.3E−06 |
| Example 1-4 | Cellulose-based (unplasticized) | 120 | 2.40 | 1,100 | 7.80 | 93 | 20 | 2,000 | 1.7E−05 |
| Example 1-5 | Cellulose-based (unplasticized) | 120 | 2.95 | 900 | 4.90 | 93 | 3 | 700 | 5.8E−06 |
| Comparative Example 1-1 | Cellulose-based (plasticizer C) | 120 | 2.86 | 530 | 3.10 | 93 | 5.22 | 70 | 5.8E−07 |
| Comparative Example 1-2 | Fluorine-based | 100 | — | 20 | 0.01 | 87 | 18.27 | 20 | 2.0E−07 |
| Comparative Example 1-3 | Vinyl chloride-based | 75 | — | 40 | 0.02 | 86 | 0.29 | 0.4 | 5.3E−09 |

<Water Vapor Permeability>

For each film, according to the technique described in JIS Z 0208:1976 "Testing methods for determination of the water vapor permeability of moisture-proof packaging materials (cup method)", the amount (g/m²/24 h) of water vapor passing through the film for 24 hours under the conditions of a temperature of 40° C. and a relative humidity of 90% was measured.

<Equilibrium Moisture Content>

From each film, 500 mg of a sample was collected and humidified for 24 hours in an environment with a relative humidity of 80%, and then the amount of moisture thereof was measured using a Karl Fischer moisture meter (AQ-2200, manufactured by HIRANUMA SANGYO Co., LTD.).

<Light Transmittance>

For each film, the transmittance at a wavelength region (400 to 700 nm) effective for photosynthesis was measured using a spectrophotometer (manufactured by Jasco Engineering and Sales, Inc.: V-560), and the average thereof was calculated.

<$CO_2$ Permeability Coefficient>

(1) Dry Film Condition

Each film was humidified for 24 hours or longer in an environment with a temperature of 25° C. and a relative humidity of 55%, and then measured at a temperature of 40° C. within a sample evaluation area of 3.14 cm². Carbon dioxide was supplied to the surface (supply side) of the sample under a pressure of 800 kPa, and the pressure of the back surface (permeation side) of the sample was reduced down to 3 Pa by using a vacuum pump. The vacuum pump was then stopped, the pressure change in the permeation side was recorded, and the permeation coefficient was calculated by a dime-delay method according to JIS K 6275-1.

(2) Humid Film Condition

For each film, the $CO_2$ permeability coefficient was measured under humid film conditions (environment with room temperature (25° C.) and a relative humidity of 80%) by the measurement method described above.

<$CO_2$ Permeability (Humid Film Condition)>

The $CO_2$ permeability was calculated by the following equation by using the $CO_2$ permeability coefficient (unit:

From the results shown in Table 2, it was understood that even though the film contains a cellulose acylate resin, if the equilibrium moisture content is less than 4% at a temperature of 25° C. and a relative humidity of 80%, the $CO_2$ permeability is reduced (Comparative Example 1-1).

Furthermore, it was understood that, in a case where a fluorine-based film or a vinyl chloride-based film not containing a cellulose acylate resin is used, the equilibrium moisture content is extremely low, and the $CO_2$ permeability coefficient and the $CO_2$ permeability at the time of humidifying the film are reduced (Comparative Example 1-2 and 1-3).

In contrast, it was understood that, in a case where the film which contains a cellulose acylate resin and has an equilibrium moisture content of 4% to 8% at a temperature of 25° C. and relative humidity of 80% is used, both the $CO_2$ permeability coefficient and the $CO_2$ permeability at the time of humidifying the film are increased (Examples 1-1 to 1-5).

Furthermore, from the comparison of Examples 1-1 to 1-5 and Comparative Example 1-1, it was understood that, by the degree of acetyl group substitution of cellulose acylate or the type of plasticizer, the equilibrium moisture content or the $CO_2$ permeability coefficient be adjusted. Particularly, from the comparison of Examples 1-1, 1-4 and 1-5, it was understood that Example 1-4 in which the degree of acetyl group substitution is within a range of 2.2 to 2.6, the equilibrium moisture content increases, and the $CO_2$ permeability coefficient and the $CO_2$ permeability at the time of humidifying the film further increase.

[Preparation of Agricultural Greenhouse]

In Miyanodai, Minamiashigara-shi, a framework with a size of 6 m×9 m×4 m (height) was set up, and each of the films shown in the following Table 3 that were prepared and used in Examples 1-1 to 1-5 and Comparative Examples 1-1 to 1-3 was spread over the frame, thereby preparing an agricultural greenhouse.

Furthermore, a thermometer and a $CO_2$ concentration meter were installed in a position 1.5 m above the central ground in the prepared agricultural greenhouse.

For the prepared agricultural greenhouse, the internal $CO_2$ concentration and the external $CO_2$ concentration of the greenhouse were measured during the daytime (13:00) on a clear day in October, 2014, and the internal temperature and the external temperature of the greenhouse were also measured. The results are shown in the following Table 3. The external temperature of the greenhouse was 17° C., and the relative humidity was 89%.

cases, and a $CO_2$ concentration necessary for the photosynthesis can be maintained.

Particularly, from the comparison of Examples 1-1, 1-4, and 1-5, it was understood that, in Example 1-4 in which the degree of acetyl group substitution is within a range of 2.2 to 2.6, the equilibrium moisture content increases, the $CO_2$ concentration ratio becomes 100%, and the $CO_2$ concentra-

TABLE 3

|  | Film | Equilibrium moisture content % | $CO_2$ concentration (13:00) | | | Internal temperature and humidity of greenhouse (13:00) | |
|---|---|---|---|---|---|---|---|
|  |  |  | Inside of greenhouse ppm | Outside of greenhouse ppm | Ratio (inside of greenhouse/ outside of greenhouse | Temperature ° C. | Relative humidity % |
| Example 1-1 | Cellulose-based (unplasticized) | 5.22 | 380 | 400 | 95% | 27.5 | 76 |
| Example 1-2 | Cellulose-based (plasticizer A) | 4.10 | 330 | 400 | 83% | 27.0 | 73 |
| Example 1-3 | Cellulose-based (plasticizer B) | 4.34 | 350 | 400 | 88% | 28.2 | 70 |
| Example 1-4 | Cellulose-based (unplasticized) | 7.80 | 400 | 400 | 100% | 27.5 | 72 |
| Example 1-5 | Cellulose-based (unplasticized) | 4.90 | 330 | 400 | 83% | 27.7 | 80 |
| Comparative Example 1-1 | Cellulose-based (plasticizer C) | 3.10 | 300 | 400 | 75% | 29.0 | 87 |
| Comparative Example 1-2 | Fluorine-based | 0.01 | 290 | 400 | 73% | 28.4 | 85 |
| Comparative Example 1-3 | Vinyl chloride-based | 0.02 | 200 | 400 | 50% | 27.3 | 91 |

From the results shown in Table 3, it was understood that, even though the film contains a cellulose acylate resin, if the equilibrium moisture content is less than 4% at a temperature of 25° C. and a relative humidity of 80%, a ratio between the internal $CO_2$ concentration of the greenhouse and the external $CO_2$ concentration of the greenhouse (inside of greenhouse/outside of greenhouse) [hereinafter, simply described as "$CO_2$ concentration ratio" in the present paragraph] is reduced (Comparative Example 1-1).

Furthermore, it was understood that, in a case where a fluorine-based film or a vinyl chloride-based film not containing a cellulose acylate resin is used, the equilibrium moisture content is extremely low, and the $CO_2$ concentration ratio is reduced (Comparative Examples 1-2 and 1-3).

In contrast, it was understood that, in a case where the film which contains a cellulose acylate resin and has an equilibrium moisture content of 4% to 8% at a temperature of 25° C. and a relative humidity of 80% is used, the $CO_2$ concentration ratio becomes equal to or higher than 80% in all tion can be maintained at the same level as the external $CO_2$ concentration of the greenhouse.

[Growth of Plant]

In the agricultural greenhouse using each of the films prepared and used in Examples 1-1 and Comparative Examples 1-2 and 1-3, three varieties including large-sized tomatoes (MISORA), medium-sized tomatoes (FRUTIKA), and mini tomatoes (FABRYSAKURA) were grown from September through to November, 2014. The yields of tomatoes harvested for 1 month during which the growth was stabilized were compared.

The results of growth (yield) are shown in the following Table 4.

TABLE 4

|  | Film | Equilibrium moisture content % | $CO_2$ concentration (13:00) | | | Yield kg/m² · month |
|---|---|---|---|---|---|---|
|  |  |  | Inside of greenhouse ppm | Outside of greenhouse ppm | Ratio (inside of greenhouse/outside of greenhouse) |  |
| Example 1-1 | Cellulose-based (unplasticized) | 5.22 | 380 | 400 | 95% | 0.56 |
| Comparative Example 1-2 | Fluorine-based | 0.01 | 290 | 400 | 73% | 0.37 |
| Comparative Example 1-3 | Vinyl chloride-based | 0.02 | 200 | 400 | 50% | 0.38 |

From the results shown in Table 4, it was understood that the agricultural greenhouse using the cellulose film, which contains a cellulose acylate resin and has an equilibrium moisture content of 4% to 8% at a temperature of 25° C., a relative humidity of 80% and a thickness of 60 to 200 μm, can maintain the $CO_2$ concentration, and accordingly, the yield in the agricultural greenhouse is higher than that in the agricultural greenhouse using a fluorine-based film or a vinyl chloride-based film.

[Second Aspect]

Hereinafter, the second aspect of the present invention will be more specifically described based on examples. The materials and the amount thereof used, the proportion of the materials, the treatment content, the treatment procedure, and the like shown in the following examples can be appropriately changed within a scope that does not depart from the gist of the present invention. Accordingly, the scope of the present invention is not limited to the following examples.

[Preparation of Film 1]

<Preparation of Dope>

The following composition was put into a mixing tank and stirred such that each component dissolved, thereby preparing a cellulose acetate solution.

| | |
|---|---|
| Cellulose acylate (degree of acetyl group substitution: 2.86, viscosity average polymerization degree: 320) | 100 parts by mass |
| Silica particle dispersion (average particle size: 16 nm) "AEROSIL R972" manufactured by NIPPON AEROSIL CO., LTD | 1.3 parts by mass |
| Methylene chloride | 635 parts by mass |
| Methanol | 1.3 parts by mass |

<Formation of Film 1>

The dope whose temperature was adjusted to be 30° C. was uniformly cast on an endless stainless steel belt (support) such that the film thickness after drying became 100 µm.

Immediately after casting, the dope film (web) on the belt was dried by being exposed to hot air with a temperature of 100° C. Then, 120 seconds after casting, the film was peeled at a peeling tension of 150 N/m and dried while being transported by a large number of rolls at a transport tension of 100 N/m. The temperature of the endless stainless steel belt in the peeling portion was set to be 10° C. The amount of the residual solvent at the time of peeling was 100% by mass.

The film was dried by being transported for 5 minutes within a first drying zone set to be 80° C. and then for 10 minutes within a second drying zone set to be 120° C. After being dried, the film was wound in the form of a roll, thereby obtaining a cellulose-based film 1 having a film width of 1.5 m, a rolled length of 2,000 m, and a film thickness of 100 µm. The amount of the residual solvent at the time of winding was 0.3% by mass.

[Preparation of Film 2]

A cellulose-based film 2 having a film width of 1.5 m, a rolled length of 2,000 m, and a film thickness of 120 µm was obtained by the same method as used for preparing the film 1, except that dope was uniformly cast on an endless stainless steel belt (support) such that the film thickness after drying became 120 µm.

[Film 3]

As a fluorine-based film 3, a product named "F-CLEAN (registered trademark) SHIZENKORYUTEKI" manufactured by AGC Green-Tech Co., Ltd was used.

For each of the prepared films or the commercially available films used, a water vapor permeability and a light transmittance were measured and evaluated by the following methods. The results are shown in the following Table 5.

<Water Vapor Permeability>

For each film, according to the technique described in JIS Z 0208:1976 "Testing methods for determination of the water vapor permeability of moisture-proof packaging materials (cup method)", the amount ($g/m^2/24$ h) of water vapor passing through the film for 24 hours under the conditions of a temperature of 40° C. and a relative humidity of 90% was measured.

<Light Transmittance>

For each film, the transmittance of light at 555 nm was measured using a spectrophotometer (manufactured by Jasco Engineering and Sales, Inc.: V-560).

Examples 2-1 to 2-3 and Comparative Examples 2-1 and 2-2

<Preparation of Agricultural Greenhouse>

In Miyanodai, Minamiashigara-shi, a framework with a size of 6 m×9 m×4 m (height) was set up, and each of the films shown in the following Table 5 was spread over the frame, thereby preparing an agricultural greenhouse.

In addition, to the ceiling of the prepared agricultural greenhouse, a mist cooling device (air cooler AC 4543, manufactured by FULTA ELECTRIC MACHINERY CO. LTD) was fixed in a pendant state.

Furthermore, a thermo-hygrometer was installed in a position 1.5 m above the central ground in the agricultural greenhouse, and a water gauge measuring the spray amount was installed immediately before the water inlet port of the mist cooling device.

<Growth of Plant>

In July, 2014, 38 large-sized tomato plants (MISORA), 35 medium-sized tomato plants (FURUTIKA), and 70 mini tomato plants (FABRYSAKURA) were grown in the prepared agricultural greenhouse.

At noon (12:00) on a clear day in July, 2014, the mist cooling device was moved such that the mist was sprayed by the amount shown in the following Table 5. After 2 hours, at 14:00, the internal temperature, the internal relative humidity of the greenhouse as well as whether or not dew condensation occurred were checked. The external temperature and the external relative humidity of the greenhouse at 14:00 are shown in the following Table 5.

In Examples 2-1 to 2-3 and Comparative Examples 2-1 and 2-2, the mist cooling was performed without conducting ventilation at the time of moving the mist cooling device. In Comparative Example 2-3 which will be described later, mist cooling was performed with ventilation.

Comparative Example 2-3

The plants were grown by performing mist cooling under the same conditions as in Comparative Example 2-1, except that, between 7:00 and 17:00, both sides of the film (9 m×1.5 m) of the lateral surface of the greenhouse were rolled up so as to perform ventilation.

Although insect-proof mesh was mounted on the opening portion that was exposed when the film was rolled up, it was confirmed that the growing tomatoes were damaged by insects such as *Bemisia tabaci* or Agromyzidae.

TABLE 5

| | | | Film | | | Inside of greenhouse | | | | Outside of greenhouse | |
|---|---|---|---|---|---|---|---|---|---|---|---|
| | | | | | | | In mist | | | | |
| | No. | Material | Thickness μm | Water vapor permeability g/m²/24 h | Light transmittance % | Amount of mist sprayed g/m²·min | Temperature °C | Relative humidity % | Dew condensation | In mist Ventilation | Temperature °C | Relative humidity % |
| Example 2-1 | 1 | Cellulose-based | 100 | 1,000 | 90 | 14 | 38.2 | 91 | Not occurred | Not performed | 36.5 | 41 |
| Example 2-2 | 2 | Cellulose-based | 120 | 800 | 91 | 14 | 40.7 | 86 | Not occurred | Not performed | 36.6 | 42 |
| Example 2-3 | 1 | Cellulose-based | 100 | 1,000 | 90 | 7 | 43.5 | 84 | Not occurred | Not performed | 36.4 | 41 |
| Comparative Example 2-1 | 3 | Fluorine-based | 100 | 20 | 85 | 14 | 44.9 | 100 | Occurred | Not performed | 34.8 | 43 |
| Comparative Example 2-2 | 3 | Fluorine-based | 100 | 20 | 85 | 7 | 49.3 | 100 | Occurred | Not performed | 35.1 | 42 |
| Comparative Example 2-3 | 3 | Fluorine-based | 100 | 20 | 85 | 14 | 43.2 | 75 | Not occurred | Performed | 33.7 | 45 |

As shown in Table 5, from the comparison of Examples 2-1 and 2-2 and Comparative Example 2-1, it was understood that, even when the amount of mist sprayed by mist cooling is the same, the agricultural greenhouse using a cellulose film, which contains a cellulose acylate resin and has a water vapor permeability equal to or higher than 600 g/m²/24 h and a thickness of 80 to 200 μm, can reduce the internal temperature and the internal relative humidity of the greenhouse and can inhibit the occurrence of dew condensation of the mist.

Similarly, from the comparison of Example 2-3 and Comparative Example 2-2, it was understood that, even when the amount of mist sprayed by mist cooling is the same, the agricultural greenhouse using a cellulose film, which has a water vapor permeability equal to or higher than 600 g/m²/24 h and a thickness of 80 to 200 μm, can reduce the internal temperature and the internal relative humidity of the greenhouse and can inhibit the occurrence of dew condensation of the mist.

In contrast, in Comparative Example 2-3 in which ventilation was performed to inhibit the occurrence of dew condensation during mist cooling and to reduce the temperature, as described above, it was confirmed that the growing tomatoes were damaged by insects such as *Bemisia tabaci* or Agromyzidae.

From the above results, it was understood that the agricultural greenhouse using a cellulose film, which contains a cellulose acylate resin and has a water vapor permeability equal to or higher than 600 g/m²/24 h and a thickness of 80 to 200 μm, does not require ventilation means and can inhibit the inflow of pests.

For the agricultural greenhouses prepared in Examples 2-1 and 2-2 and Comparative Example 2-1, whether or not dew condensation occurred within the time period from night to morning during which mist cooling was not performed, was observed.

As a result, it was confirmed that, while dew condensation occurs in the agricultural greenhouse prepared in Comparative Example 2-1, it does not occur in the agricultural greenhouses prepared in Example 2-1 and 2-2.

Therefore, it was understood that the agricultural greenhouse using a cellulose film, which contains a cellulose acylate resin and has a water vapor permeability equal to or higher than 600 g/m²/24 h and a thickness of 80 to 200 μm, does not require ventilation means, can inhibit the inflow of pests, and is useful even during a time period of when the mist cooling is not performed.

Figure 7:
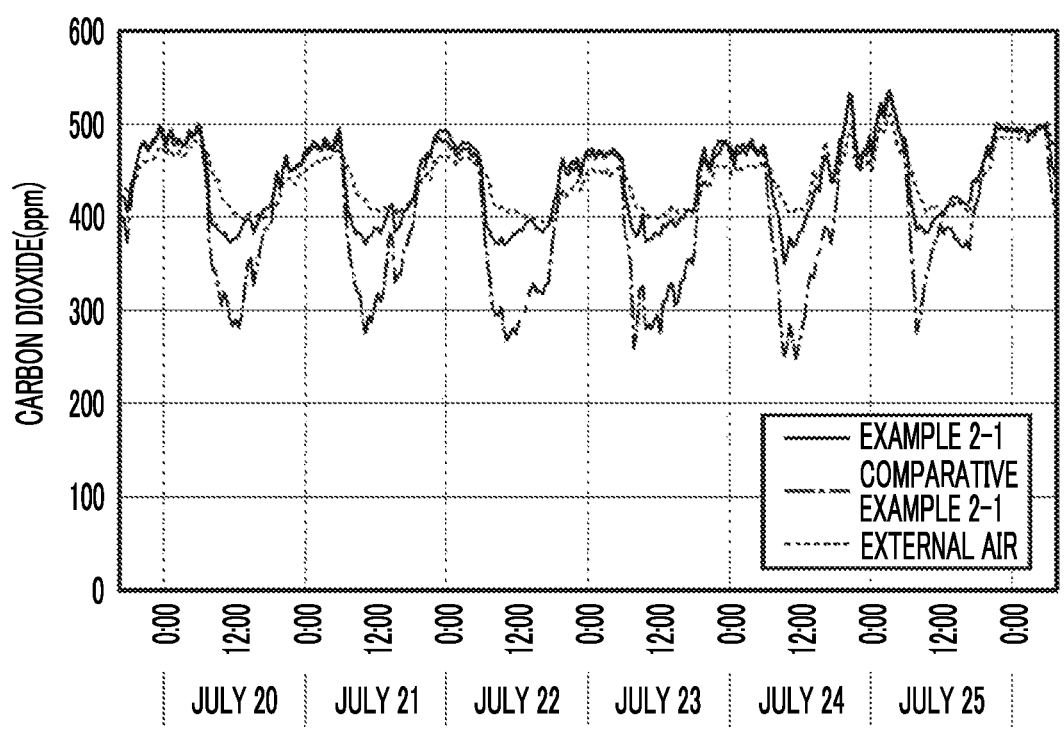
FIG. 7 is a graph showing a change in carbon dioxide concentration that occurs on the inside and the outside (external air) of the greenhouse when a mist cooling device is moved in the agricultural greenhouses prepared in Example 2-1 and Comparative Example 2-1 of the second aspect of the present invention.

For the agricultural greenhouses prepared in the same manner as in Example 2-1 and Comparative Example 2-1, the internal carbon dioxide concentration of the greenhouse and the external carbon dioxide concentration were measured from Jul. 20 to 25, 2014. The results are shown in FIG. 7. The mist cooling device was moved for 10 hours from 7:00 to 17:00 under the condition of a spray amount of 14 g/m²·min.

From the results shown in FIG. 7, it was understood that the agricultural greenhouse prepared in Example 2-1 can maintain the carbon dioxide concentration at a level approximately the same as the carbon dioxide concentration in the external air even during the daytime when plants photosynthesize.

Therefore, it was understood that the agricultural greenhouse using a cellulose film, which contains a cellulose acylate resin and has a water vapor permeability equal to or higher than 600 g/m²/24 h and a thickness of 80 to 200 μm, does not require ventilation means, can inhibit the inflow of pests, and has an effect of being able to maintain the carbon dioxide concentration at a level approximately the same as the carbon dioxide concentration in the external air.

[Third Aspect]

Hereinafter, the third aspect of the present invention will be more specifically described based on examples. The materials and the amount thereof used, the proportion of the materials, the treatment content, the treatment procedure, and the like shown in the following examples can be appropriately changed within a scope that does not depart from the gist of the present invention. Accordingly, the scope of the present invention is not limited to the following examples.

[Preparation of Triacetyl Cellulose (TAC) Film]
<Preparation of Dope>

The following composition was put into a mixing tank and stirred such that each component dissolved, thereby preparing a cellulose acetate solution.

| | |
|---|---|
| Cellulose acylate (degree of acetyl group substitution: 2.86, viscosity average polymerization degree: 320) | 100 parts by mass |

-continued

| | |
|---|---|
| Silica particle dispersion (average particle size: 16 nm) "AEROSIL R972" manufactured by NIPPON AEROSIL CO., LTD | 1.3 parts by mass |
| Methylene chloride | 635 parts by mass |
| Methanol | 1.3 parts by mass |

<Formation of TAC Film>

The dope whose temperature was adjusted to be 30° C. was uniformly cast on an endless stainless steel belt (support) such that the film thickness after drying became 100 µm.

Immediately after casting, the dope film (web) on the belt was dried by being exposed to hot air with a temperature of 100° C. Then, 120 seconds after casting, the film was peeled at a peeling tension of 150 N/m and dried while being transported by a large number of rolls at a transport tension of 100 N/m. The temperature of the endless stainless steel belt in the peeling portion was set to be 10° C. The amount of the residual solvent at the time of peeling was 100% by mass.

The film was dried by being transported for 5 minutes within a first drying zone set to be 80° C. and then for 10 minutes within a second drying zone set to be 120° C. After being dried, the film was wound in the form of a roll, thereby obtaining a TAC film having a film width of 1.5 m, a rolled length of 2,000 m, and a film thickness of 100 µm. The amount of the residual solvent at the time of winding was 0.3% by mass.

[Fluorine-Based Film]

As a fluorine-based film, a product named "F-CLEAN (registered trademark) SHIZENKORYUTEKI" manufactured by AGC Green-Tech Co., Ltd was used.

[Microporous Polyolefin (Microporous PO) Film]

As a microporous PO film, a product named "KAITEKI-KUKAN" manufactured by Mitsubishi Plastics Agri Dream Co., Ltd was used.

Examples 3-1 to 3-5, Comparative Examples 3-1 to 3-4, and Reference Examples 1 and 2

<Preparation of Agricultural Greenhouse>

In Miyanodai, Minamiashigara-shi, a framework with a size of 6.0 m×9.0 m×4.0 m (height) was set up, and each of the covering films shown in the following Table 6 was spread over the frame, thereby preparing an agricultural greenhouse.

Then, on the inside of the prepared agricultural greenhouse, a framework with a size of 5.8 m×8.8 m×3.8 m (height) was set up, and each of the lining films shown in the following Table 6 was spread over the frame, thereby preparing an agricultural greenhouse.

In the following Table 6, the aspect in which "TAC/fluorine-based" is described as the lining film means that a TAC film was used for the roof portion of the lining film and a fluorine-based film was used for the wall surface portion of the lining film as shown in the following Table 6.

In Reference Examples 1 and 2, the agricultural greenhouse was used over which only the covering film was spread without using the lining film.

For the prepared agricultural greenhouse, the water vapor permeability and the light transmittance of the lining film and the covering film were measured and evaluated by the following methods. The results are shown in the following Table 6.

Furthermore, for the prepared agricultural greenhouse, at 08:00 A.M on a clear day in November, 2014, whether or not the dew condensation occurred on the inside of the lining film was visually checked, and at 18:00 after sunset on the same day, the internal temperature and the internal relative humidity of the agricultural greenhouse were measured. The results are also shown in the following Table 6.

<Water Vapor Permeability>

For each film, according to the technique described in JIS Z 0208:1976 "Testing methods for determination of the water vapor permeability of moisture-proof packaging materials (cup method)", the amount ($g/m^2/24$ h) of water vapor passing through the film for 24 hours under the conditions of a temperature of 40° C. and a relative humidity of 90% was measured.

In the following Table 6, for Examples 3-3 and 3-5, the water vapor permeability of the TAC film used for the roof portion of the lining film is shown.

<Light Transmittance>

For each film, the transmittance at a visible region of 400 to 700 nm was measured using a spectrophotometer (manufactured by Jasco Engineering and Sales, Inc.: V-560), and the average thereof was calculated.

In a case where the product of the average light transmittance of the lining film and the average light transmittance of the covering film was equal to or higher than 80%, the light transmittance of the agricultural greenhouse was regarded as being high and was evaluated to be "A". In a case where the product was equal to or higher than 60% and less than 80%, the light transmittance of the agricultural greenhouse was regarded as being slightly low and was evaluated to be "B". In a case where the product was less than 60%, the light transmittance of the agricultural greenhouse was regarded as being low and was evaluated to be "C".

TABLE 6

| | | | Covering film | | Lining film | | |
|---|---|---|---|---|---|---|---|
| | Type of film | | Water vapor permeability | Thickness | Water vapor permeability | Thickness | Portion |
| | Covering | Lining | $g/m^2/24$ h | µm | $g/m^2/24$ h | µm | Roof portion |
| Example 3-1 | TAC | TAC | 1,000 | 100 | 1,000 | 100 | TAC |
| Example 3-2 | TAC | TAC | 1,000 | 100 | 1,000 | 100 | TAC |
| Example 3-3 | TAC | TAC/fluorine-based | 1,000 | 100 | 1,000 (roof portion) | 100 | TAC |
| Example 3-4 | Fluorrine-based | TAC | 20 | 100 | 1,000 | 100 | TAC |
| Example 3-5 | Fluorrine-based | TAC/fluorine-based | 20 | 100 | 1,000 (roof portion) | 100 | TAC |

TABLE 6-continued

|  |  |  |  |  |  |  |  |
|---|---|---|---|---|---|---|---|
| Comparative Example 3-1 | Fluorrine-based | Fluorine-based | 20 | 100 | 20 | 100 | Fluorine-based |
| Comparative Example 3-2 | Fluorrine-based | Fluorine-based | 20 | 100 | 20 | 100 | Fluorine-based |
| Comparative Example 3-3 | Fluorrine-based | TAC | 20 | 100 | 1,000 | 100 | TAC |
| Comparative Example 3-4 | Fluorrine-based | Microporous PO | 20 | 100 | 1,200 | 100 | Microporous PO |
| Reference Example 1 | TAC | — | 1,000 | 100 | — | — | — |
| Reference Example 2 | Fluorrine-based | — | 20 | 100 | — | — | — |

| | Lining film | | | | Internal environment of greenhouse | |
|---|---|---|---|---|---|---|
| | Portion Wall surface portion | Ventilation means | Dew condensation | Light transmittance | Temperature °C. | Relative humidity % |
| Example 3-1 | TAC | Covering film, ventilation fan | Not occurred | A | 15 | 80 |
| Example 3-2 | TAC | Covering film | Not occurred | A | 18 | 83 |
| Example 3-3 | Fluorine-based | Covering film, ventilation fan | Not occurred | A | 16 | 81 |
| Example 3-4 | TAC | Ventilation fan | Not occurred | A | 15 | 85 |
| Example 3-5 | Fluorine-based | Ventilation fan | Not occurred | A | 16 | 88 |
| Comparative Example 3-1 | Fluorine-based | N/A | Occurred | B | 18 | 99 |
| Comparative Example 3-2 | Fluorine-based | Ventilation fan | Occurred | B | 13 | 99 |
| Comparative Example 3-3 | TAC | N/A | Occurred | A | 17 | 90 |
| Comparative Example 3-4 | Microporous PO | Ventilation fan | Occurred | C | 14 | 85 |
| Reference Example 1 | — | Covering film | Not occurred | A | 10 | 85 |
| Reference Example 2 | — | N/A | Occurred | B | 10 | 99 |

As shown in Table 6, it was understood that, in a case where a fluorine-based film is used as the lining film, regardless of the existence of ventilation means, dew condensation occurs, and the light transmittance is reduced (Comparative Examples 3-1 and 3-2).

Furthermore, it was understood that, in a case where a TAC film having a water vapor permeability equal to or higher than 600 g/m$^2$/24 h is used as the lining film, if the agricultural greenhouse does not have ventilation means, the occurrence of dew condensation cannot be inhibited (Comparative Example 3-3).

In addition, it was understood that, in a case where a microporous PO film is used as the lining film in consideration of JP2011-10590A, even if the agricultural greenhouse has ventilation means, dew condensation occurs, and the light transmittance is reduced (Comparative Example 3-4).

In contrast, it was understood that, in a case where a TAC film having a water vapor permeability equal to or higher than 600 g/m$^2$/24 h is used in at least a portion of the lining film, and the agricultural greenhouse has ventilation means, the dew condensation occurring on the inside of the lining film is inhibited, and the light transmittance increases (Examples 3-1 to 3-5)

Particularly, it was understood that, in Examples 3-1 to 3-3 in which a TAC film is also used as the covering film, the covering film itself functions as ventilation means, and accordingly, regardless of the existence of a ventilation fan, the internal relative humidity of the greenhouse can be reduced.

[Fourth Aspect]

Hereinafter, the fourth aspect of the present invention will be more specifically described based on examples. The materials and the amount thereof used, the proportion of the materials, the treatment content, the treatment procedure, and the like shown in the following examples can be appropriately changed within a scope that does not depart from the gist of the present invention. Accordingly, the scope of the present invention is not limited to the following examples.

<Synthesis of Plasticizer>

By the following method, as plasticizers used in Examples 4-1 to 4-26, polyether esters and polyethers were synthesized. Regarding each of the synthesized polyether esters, the number of polymerized monomers (n), the number of polymerized monomers (p), and the terminal ($R^3$) in Formula (A) described above are shown in the following Tables 7 and 8. Regarding each of the synthesized polyethers, the number of polymerized monomers (m), the terminal ($R^5$), and the terminal ($R^6$) in Formula (B) described above are shown in the following Tables 7 and 8.

(Plasticizer A—Used in Example 4-1)
Adipic acid and monoethylene glycol were polyesterified by a thermal melting condensation method, thereby synthesizing a polyether ester.

(Plasticizer B—Used in Example 4-2)
Adipic acid and diethylene glycol were polyesterified by a thermal melting condensation method, thereby synthesizing a polyether ester.

(Plasticizer C—Used in Example 4-3)
Adipic acid and triethylene glycol were polyesterified by a thermal melting condensation method, thereby synthesizing a polyether ester.

(Plasticizer D—Used in Example 4-4)
Adipic acid and tetraethylene glycol were polyesterified by a thermal melting condensation method, thereby synthesizing a polyether ester.

(Plasticizer E—Used in Example 4-5)
Adipic acid and triethylene glycol were polyesterified by a thermal melting condensation method, thereby synthesizing a polyether ester.

(Plasticizer F—Used in Example 4-6)
Adipic acid and triethylene glycol were polyesterified by a thermal melting condensation method, thereby synthesizing a polyether ester.

(Plasticizer G—Used in Example 4-7)
Adipic acid and triethylene glycol were polyesterified by a thermal melting condensation method, thereby synthesizing a polyether ester.

(Plasticizer H—Used in Example 4-8)
Succinic acid and triethylene glycol were polyesterified by a thermal melting condensation method, thereby synthesizing a polyether ester.

(Plasticizer I—Used in Example 4-9)
Succinic acid and tetraethylene glycol were polyesterified by a thermal melting condensation method, thereby synthesizing a polyether ester.

(Plasticizer J—Used in Example 4-10)
Succinic acid and tetraethylene glycol were polyesterified by a thermal melting condensation method, thereby synthesizing a polyether ester.

(Plasticizer K—Used in Example 4-11)
Glutaric acid and triethylene glycol were polyesterified by a thermal melting condensation method, thereby synthesizing a polyether ester.

(Plasticizer L—Used in Example 4-12)
Adipic acid and 1,2-propylene glycol were polyesterified by a thermal melting condensation method, thereby synthesizing a polyether ester.

(Plasticizer M—Used in Example 4-13)
Adipic acid and tri(1,2-propylene glycol) were polyesterified by a thermal melting condensation method, thereby synthesizing a polyether ester.

(Plasticizer N—Used in Example 4-14)
Adipic acid and 1,2-butylene glycol were polyesterified by a thermal melting condensation method, thereby synthesizing a polyether ester.

(Plasticizer O—Used in Example 4-15)
Adipic acid and monoethylene glycol were polyesterified by a thermal melting condensation method, thereby synthesizing a polyether ester.

(Plasticizer P—Used in Example 4-16)
Adipic acid and monoethylene glycol were polyesterified by a thermal melting condensation method, thereby synthesizing a polyether ester.

(Plasticizer Q—Used in Example 4-17)
Ethylene oxide was sequentially reacted three times with phenol by ring-opening addition, thereby synthesizing a polyether as shown in the following scheme.

(Plasticizer R—Used in Example 4-18)
Ethylene oxide was sequentially reacted twice with phenol by ring-opening addition, thereby synthesizing a polyether.

(Plasticizer S—Used in Example 4-19)
Ethylene oxide was sequentially reacted twice with hydroxyethyl methacrylate by ring-opening addition, thereby synthesizing a polyether as shown in the following scheme.

(Plasticizer T—Used in Example 4-20)
Propylene oxide was sequentially reacted 8 times with hydroxyethyl methacrylate by ring-opening addition, thereby synthesizing a polyether.

(Plasticizer U—Used in Example 4-21)
Adipic acid and triethylene glycol were polyesterified by a thermal melting condensation method, thereby synthesizing a polyether ester.

(Plasticizer V—Used in Example 4-22)
Adipic acid and diethylene glycol were polyesterified by a thermal melting condensation method, thereby synthesizing a polyether ester.

(Plasticizer W—Used in Example 4-23)
Succinic acid, monoethylene glycol, and tetraethylene glycol were polyesterified by a thermal melting condensation method, thereby synthesizing a polyether ester.

(Plasticizer X—Used in Example 4-24)
Adipic acid, monoethylene glycol, and tetraethylene glycol were polyesterified by a thermal melting condensation method, thereby synthesizing a polyether ester.

(Plasticizer Y—Used in Example 4-25)
Adipic acid, 1,2-propylene glycol, and tetraethylene glycol were polyesterified by a thermal melting condensation method, thereby synthesizing a polyether ester.

(Plasticizer Z—Used in Example 4-26)

Adipic acid, 1,3-butanediol, and tetraethylene glycol were polyesterified by a thermal melting condensation method, thereby synthesizing a polyether ester.

Examples 4-1 to 4-26

<Preparation of Dope>

The following composition was put into a mixing tank and stirred such that each component dissolved, thereby preparing a cellulose acetate solution.

| | |
|---|---|
| Cellulose acylate (degree of acetyl group substitution: 2.86, viscosity average polymerization degree: 320) | 100 parts by mass |
| Plasticizers shown in the following Tables 7 and 8 | Amount shown in each table (parts by mass) |
| Silica particle dispersion (average particle size: 16 nm) "AEROSIL R972" manufactured by NIPPON AEROSIL CO., LTD | 1.3 parts by mass |
| Methylene chloride | 635 parts by mass |
| Methanol | 1.3 parts by mass |

<Preparation of Film>

The dope whose temperature was adjusted to be 30° C. was uniformly cast on an endless stainless steel belt (support) such that the film thickness after drying became 100 μm.

Immediately after casting, the dope film (web) on the belt was dried by being exposed to hot air with a temperature of 100° C. Then, 120 seconds after casting, the film was peeled at a peeling tension of 150 N/m and dried while being transported by a large number of rolls at a transport tension of 100 N/m. The temperature of the endless stainless steel belt in the peeling portion was set to be 10° C. The amount of the residual solvent at the time of peeling was 100% by mass.

The film was dried by being transported for 5 minutes within a first drying zone set to be 80° C. and then for 10 minutes within a second drying zone set to be 120° C. After being dried, the film was wound into the form of a roll, thereby preparing a film for an agricultural greenhouse having a film width of 1.5 m, a rolled length of 2,000 m, and a film thickness of 80 μm. The amount of the residual solvent at the time of winding was 0.3% by mass.

Comparative Example 4-1

A film for an agricultural greenhouse was prepared by the same method as in Example 4-1, except that the plasticizer A was not blended.

Comparative Example 4-2

A film for an agricultural greenhouse was prepared by the same method as in Example 4-1, except that, instead of the plasticizer A, a dope was used which was blended with a total of 15 parts by mass of triphenyl phosphate (TPP) and biphenyl diphenyl phosphate (BDP) at a mass ratio of 2:1.

Comparative Example 4-3

As a film for an agricultural greenhouse, a PET film product named "SIXLIGHT CLEAN" manufactured by Mitsubishi Plastics Agri Dream Co., Ltd was used.

Comparative Example 4-4

As a film for an agricultural greenhouse, a vinyl chloride film product named "NOBI-ACE-MIRAI" manufactured by Mitsubishi Plastics Agri Dream Co., Ltd was used.

Comparative Example 4-5

As a film for an agricultural greenhouse, a PO film product named "SKY COAT 5" manufactured by C. I. KASEI CO., LTD was used.

Comparative Example 4-6

As a film for an agricultural greenhouse, a fluorine-based film product named "F-CLEAN SHIZENKORYUTEKI" manufactured by AGC Green-Tech Co., Ltd was used.

For each of the prepared films for an agricultural greenhouse and the commercially available products used as the films, water vapor permeability, modulus of elasticity, elongation rate, light transmittance, drip-proofness, and workability were measured and evaluated by the following methods. The results are shown in the following Tables 7 and 8.

For each of the films for an agricultural greenhouse prepared in Examples 4-5, 4-8, and 4-17 to 4-26, an elution rate was measured by the following method. The results are shown in the following Table 8.

<Water Vapor Permeability>

For each of the prepared films for an agricultural greenhouse, according to the technique described in JIS Z 0208: 1976 "Testing methods for determination of the water vapor permeation (cup method) of moisture-proof packing materials", the amount of water vapor ($g/m^2/24$ h) passing through the film for 24 hours under the conditions of a temperature of 40° C. and a relative humidity of 90% was measured.

<Modulus of Elasticity>

From each of the prepared films for an agricultural greenhouse, a total of 8 samples having a length of 150 mm in a measurement direction and a width of 15 mm were prepared by varying the orientation of cutting in the measurement direction by 45°.

Then, each sample was left as it was for 24 hours in an environment with a temperature of 25° C. and a relative humidity of 60% and then immediately stretched at an inter-chuck distance of 100 mm and a tensile rate of 200 mm/min in an atmosphere with a temperature of 25° C. and a relative humidity of 60% by using a tensile tester "STROGRAPH" manufactured by A&D Company, Limited. The stress applied at the time when the sample was stretched by 0.1% and at the time when the sample was stretched by 0.5% was measured, and from the slope thereof, the modulus of elasticity was calculated. The average thereof was calculated as a modulus of elasticity.

<Elongation Rate>

Each sample for which the modulus of elasticity was calculated was left as it was for 24 hours in an environment with a temperature of 25° C. and a relative humidity of 60% and then immediately stretched at an inter-chuck distance of 100 mm and a tensile rate of 200 mm/min in the atmosphere with a relative humidity of 60% at 25° C. by using a tensile tester "STROGRAPH" manufactured by A&D Company, Limited. From the amounts of the elongation strain applied at the time when the samples were broken, the elongation rates were calculated, and the average thereof was calculated as the elongation rate.

<Light Transmittance>

For each of the prepared films for an agricultural greenhouse, the transmittance at a visible region of 400 to 700 nm was measured using a spectrophotometer (manufactured by Jasco Engineering and Sales, Inc.: V-560), and the average thereof was calculated.

As a result of the measurement, in a case where the average light transmittance was equal to or higher than 90%, the film was evaluated to be "A". In a case where the average light transmittance was equal to or higher than 80% and less than 90%, the film was evaluated to be "B". In a case where the average light transmittance was less than 80%, the film was evaluated to be "C".

<Drip-Proofness>

A hot-water bath with a temperature of 40° C. was sealed with each of the prepared films for an agricultural greenhouse and cooled to 25° C. so as to forcedly cause dew condensation, and then the time taken for dews to disappear was measured.

In a case where the time taken for dews to disappear was less than 3 hours, the film was evaluated to be "A". In a case where the time was equal to or longer than 3 hours and less than 5 hours, the film was evaluated to be "B". In a case where the time was equal to or longer than 5 hours and less than 12 hours, the film was evaluated to be "C". In a case where the time was equal to or longer than 12 hours, the film was evaluated to be "D".

<Workability>

By using each of the prepared films for an agricultural greenhouse, an agricultural greenhouse was installed, and the way each film was broken at this time was observed.

In a case where the film was not broken, the film was evaluated to be "A". In a case where the film was found to be slightly broken at 1 or 2 sites, the film was regarded as being unproblematic for practical use and evaluated to be "B". In a case where the film was found to be seriously broken was evaluated to be "C".

<Elution Rate>

For each of the films for an agricultural greenhouse prepared in Examples 4-5, 4-8, and 4-17 to 4-26, the mass change that occurred before and after the films were immersed into water for 16 hours was measured, and the proportion of the mass of the film eluted into water was calculated as an elution rate.

Specifically, each of the prepared films for an agricultural greenhouse was dried for 8 hours at 40° C. under pressure reduction conditions, and then the mass (mass before immersion) thereof was measured. Thereafter, each of the films for an agricultural greenhouse was immersed into water with a temperature of 15° C. for 16 hours and then dried for 8 hours at 40° C. under the same pressure reduction conditions, and then the mass (mass after immersion) thereof was measured.

Then, from the following Equation (I), the elution rate was calculated.

$$\text{Elution rate} = [(\text{mass before immersion} - \text{mass after immersion})/\text{mass before immersion}] \times 100 \qquad (I)$$

Herein, the plasticizer was added in an amount of 60 parts by mass with respect to 100 parts by mass of the triacetyl cellulose (TAC), and the proportion of the plasticizer contained was 37.5% by mass. Accordingly, it is understood that, in Example 5 in which the elution rate is 36%, most of the plasticizer is eluted.

TABLE 7

| | Resin material | Plasticizer (polyether ester) | | | | | | Thickness (μm) | Water vapor permeability (g/m²/24 h) | Modulus of elasticity (GPa) | Elongation rate (%) | Light transmittance | Drip-proofness | Workability |
|---|---|---|---|---|---|---|---|---|---|---|---|---|---|---|
| | | | Diol | | | | Amount added (parts by mass) | | | | | | | |
| | | Dicarboxylic acid Type | No. | Type | Number of polymerized monomers (n) | Number of polymerized monomers (p) | Terminal (R³) | | | | | | | |
| Example 4-1 | TAC | Adipic acid | A | Monoethylene glycol | 1 | 1 | Hydrogen atom | 40 | 80 | 600 | 2.1 | 49 | A | C | B |
| Example 4-2 | TAC | Adipic acid | B | Diethylene glycol | 2 | 1 | Hydrogen atom | 40 | 80 | 660 | 2.4 | 42 | A | C | B |
| Example 4-3 | TAC | Adipic acid | C | Triethylene glycol | 3 | 1 | Methyl | 40 | 80 | 1,010 | 1.9 | 50 | A | A | A |
| Example 4-4 | TAC | Adipic acid | D | Tetraethylene glycol | 4 | 1 | Methyl | 40 | 80 | 1,090 | 2.2 | 45 | A | A | B |
| Example 4-5 | TAC | Adipic acid | E | Triethylene glycol | 3 | 1 | Methyl | 60 | 80 | 1,440 | 0.8 | 65 | A | A | A |
| Example 4-6 | TAC | Adipic acid | F | Triethylene glycol | 3 | 1 | Hydrogen atom | 40 | 80 | 930 | 2.0 | 50 | A | B | B |
| Example 4-7 | TAC | Adipic acid | G | Triethylene glycol | 3 | 1 | Acetyl | 40 | 80 | 640 | 2.1 | 50 | A | C | B |
| Example 4-8 | TAC | Succinic acid | H | Triethylene glycol | 3 | 1 | Methyl | 60 | 80 | 1,450 | 0.7 | 48 | A | A | A |
| Example 4-9 | TAC | Succinic acid | I | Tetraethylene glycol | 4 | 1 | Methyl | 60 | 80 | 1,430 | 0.8 | 56 | A | A | A |
| Example 4-10 | TAC | Succinic acid | J | Tetraethylene glycol | 4 | 1 | Methyl | 20 | 80 | 752 | 3.0 | 40 | A | C | B |
| Example 4-11 | TAC | Glutaric acid | K | Triethylene glycol | 3 | 1 | Methyl | 40 | 80 | 1,050 | 1.8 | 53 | A | A | A |
| Example 4-12 | TAC | Adipic acid | L | 1,2-propylene glycol | 1 | 1 | Methyl | 40 | 80 | 650 | 1.1 | 55 | A | C | A |
| Example 4-13 | TAC | Adipic acid | M | Tri(1,2-propylene glycol) | 3 | 1 | Methyl | 40 | 80 | 980 | 1.6 | 50 | A | B | A |
| Example 4-14 | TAC | Adipic acid | N | 1,2-butylene glycol | 1 | 1 | Methyl | 40 | 80 | 700 | 1.0 | 60 | A | C | A |
| Example 4-15 | TAC | Adipic acid | O | Monoethylene glycol | 1 | 2 | Hydrogen atom | 40 | 80 | 950 | 2.4 | 38 | A | B | B |
| Example 4-16 | TAC | Adipic acid | P | Monoethylene glycol | 1 | 1 | Hydrogen atom | 40 | 80 | 880 | 2.7 | 36 | A | B | B |

TABLE 7-continued

| | | Plasticizer (polyether) | | | | | | | | | | |
|---|---|---|---|---|---|---|---|---|---|---|---|---|
| | Resin material | No. | Terminal ($R^5$) | Terminal ($R^6$) | Number of polymerized monomers (m) | Amount added (parts by mass) | Thickness (μm) | Water vapor permeability (g/m²/24 h) | Modulus of elasticity (GPa) | Elongation rate (%) | Light transmittance | Drip-proofness | Workability |
| Example 4-17 | TAC | Q | Phenyl group | Hydrogen atom | 3 | 60 | 80 | 1,850 | 1.7 | 60 | A | A | A |
| Example 4-18 | TAC | R | Phenyl group | Hydrogen atom | 2 | 60 | 80 | 860 | 2.9 | 36 | A | B | B |
| Example 4-19 | TAC | S | Methacryloyl group | Hydrogen atom | 3 | 60 | 80 | 2,660 | 1.2 | 47 | A | A | A |
| Example 4-20 | TAC | T | Methacryloyl group | Hydrogen atom | 9 | 60 | 80 | 1,360 | 1.8 | 44 | A | A | A |
| Comparative Example 4-1 | TAC | — | — | — | — | 0 | 80 | 970 | 4.2 | 21 | A | B | C |
| Comparative Example 4-2 | TAC | TPP/BDP | | | | 15 | 80 | 450 | 4.4 | 20 | A | C | C |
| Comparative Example 4-3 | PET | — | | | | — | 150 | 23 | 3.7 | 62 | B | D | B |
| Comparative Example 4-4 | Vinyl chloride | — | | | | — | 100 | 50 | 0.0 | 314 | B | D | A |
| Comparative Example 4-5 | PO | — | | | | — | 100 | 3 | 0.1 | >560 | C | D | A |
| Comparative Example 4-6 | Fluorine-based | — | | | | — | 100 | 20 | 0.0 | 477 | B | D | A |

TABLE 8

Plasticizer (polyether ester)

| | Resin material | No. | Dicarboxylic acid Type | Diol Type | Number of polymerized monomers (n) | Number of polymerized monomers (p) | Terminal (R³) | Amount added (parts by mass) | Thickness (μm) | Water vapor permeability (g/m²/24 h) | Modulus of elasticity (GPa) | Elongation rate (%) | Elution rate (%) | Light transmittance | Drip-proofness | Workability |
|---|---|---|---|---|---|---|---|---|---|---|---|---|---|---|---|---|
| Example 4-5 | TAC | E | Adipic acid | Ethylene glycol | 3 | 1 | Methyl | 60 | 80 | 1,440 | 0.8 | 65 | 36 | A | A | A |
| Example 4-8 | TAC | H | Succinic acid | Ethylene glycol | 3 | 1 | Methyl | 60 | 80 | 1,450 | 0.7 | 48 | 32 | A | A | A |
| Example 4-21 | TAC | U | Adipic acid | Ethylene glycol | 3 | 6 | Methyl | 60 | 80 | 820 | 1.4 | 55 | 13 | A | B | A |
| Example 4-22 | TAC | V | Adipic acid | Ethylene glycol | 2 | 6 | Methyl | 60 | 80 | 710 | 1.4 | 54 | 5.4 | A | B | A |
| Example 4-23 | TAC | W | Succinic acid | Monoethylene glycol Tetraethylene glycol | 1 4 | 9 | Hydrogen atom | 60 | 80 | 820 | 1.4 | 43 | 9.5 | A | B | A |
| Example 4-24 | TAC | X | Adipic acid | Monoethylene glycol Tetraethylene glycol | 1 4 | 9 | Hydrogen atom | 60 | 80 | 1,100 | 1.2 | 56 | 7.5 | A | A | A |
| Example 4-25 | TAC | Y | Adipic add | 1,2-Propylene glycol Tetraethylene glycol | 1 4 | 9 | Hydrogen atom | 60 | 80 | 1,050 | 1.4 | 43 | 8.1 | A | A | A |
| Example 4-26 | TAC | Z | Adipic acid | 1,3-butanediol Tetraethylene glycol | 1 4 | 9 | Hydrogen atom | 60 | 80 | 1,028 | 1.7 | 42 | 6.2 | A | A | A |

Plasticizer (polyether)

| | Resin material | No. | Terminal (R⁵) | Terminal (R⁶) | Number of polymerized monomers (m) | Amount added (parts by mass) | Thickness (μm) | Water vapor permeability (g/m²/24 h) | Modulus of elasticity (GPa) | Elongation rate (%) | Elution rate (%) | Light transmittance | Drip-proofness | Workability |
|---|---|---|---|---|---|---|---|---|---|---|---|---|---|---|
| Example 4-17 | TAC | Q | Phenyl group | Hydrogen atom | 3 | 60 | 80 | 1,850 | 1.7 | 60 | 14 | A | A | A |
| Example 4-18 | TAC | R | Phenyl group | Hydrogen atom | 2 | 60 | 80 | 860 | 2.9 | 36 | 29 | A | B | B |
| Example 4-19 | TAC | S | Methacryloyl group | Hydrogen atom | 3 | 60 | 80 | 2,660 | 1.2 | 47 | 8.2 | A | A | A |
| Example 4-20 | TAC | T | Methacryloyl group | Hydrogen atom | 9 | 60 | 80 | 1,360 | 1.8 | 44 | 31 | A | A | A |

From the above results, it was understood that the film which has a water vapor permeability equal to or higher than 600 g/m²/24 h and a modulus of elasticity equal to or greater than 3.0 GPa has poor workability even though the film contains a cellulose acylate resin (Comparative Example 4-1).

Similarly, it was understood that the film which has a water vapor permeability of less than 600 g/m²/24 h and a modulus of elasticity equal to or greater than 3.0 GPa has poor workability even though the film contains a cellulose acylate resin (Comparative Example 4-2).

In contrast, it was understood that all the films using a resin other than a cellulose acylate resin have low water vapor permeability and poor drip-proofness (Comparative Examples 4-3 to 4-6).

On the contrary, it was understood that all the films, which contain a cellulose acylate resin and have a water vapor permeability equal to or higher than 600 g/m²/24 h and a modulus of elasticity of less than 3.0 GPa, have excellent drip-proofness and workability (Examples 4-1 to 4-26).

Particularly, from the comparison of Example 4-3 and Example 4-6, it was understood that, in a case where the polyether ester represented by Formula (A) described above is used as a plasticizer, if the terminal $R^3$ is an alkyl group, drip-proofness and workability are further improved.

In addition, from the comparison of Example 4-9 and Example 4-10, it was understood that, if the content of the plasticizer is 30 to 60 parts by mass with respect to 100 parts by mass of the cellulose acylate resin, drip-proofness and workability are further improved.

Furthermore, from the comparison of Examples 4-5, 4-21, and 4-22, it was understood that the higher the degree of polymerization of the plasticizer, the lower the elution rate.

Moreover, from the comparison of Examples 4-23 to 4-26, it was understood that, in a case where the degree of polymerization of the plasticizer is the same, the plasticizer synthesized using adipic acid which is a dicarboxylic acid having a large number of carbon atoms reduces the degree of elution.

EXPLANATION OF REFERENCES

1: film
2: frame
10: agricultural greenhouse
11: covering film
12: lining film
12a: roof portion of lining film
12b: wall surface portion of lining film
13: frame
14: ventilation fan
20: agricultural greenhouse

What is claimed is:

1. A film for an agricultural greenhouse that is a cellulose film, comprising:
   a cellulose acylate resin; and
   a plasticizer,
   wherein the film has an equilibrium moisture content falling within a range of 4% to 8% at a temperature of 25° C. and a relative humidity of 80% and a thickness falling within a range of 60 to 200 μm,
   wherein the plasticizer is an ester-based plasticizer containing a polyether ester represented by the following Formula (A) or an ether-based plasticizer containing a polyether represented by the following Formula (B), and
   wherein a content of the plasticizer, with respect to 100 parts by mass of the cellulose acylate resin, is 10 to 70 parts by mass,

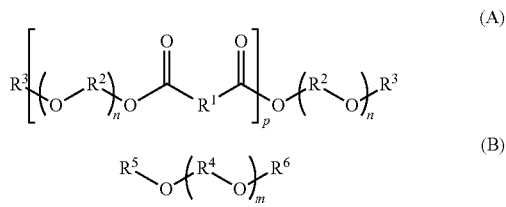

in Formula (A), $R^1$ represents a divalent aliphatic hydrocarbon group having 2 to 10 carbon atoms, $R^2$ each independently represents a divalent aliphatic hydrocarbon group having 2 to 6 carbon atoms, $R^3$ each independently represents a hydrogen atom, an alkyl group having 1 to 20 carbon atoms, an aryl group having 6 to 20 carbon atoms, or an acyl group having 2 to 20 carbon atoms, n each independently represents an integer of 1 to 20, p represents an integer of 1 to 15, and a plurality of $R^1$'s, $R^2$'s, and n's contained in a repeating unit may be the same as or different to each other, and in Formula (B), $R^4$ represents a divalent aliphatic hydrocarbon group having 2 to 6 carbon atoms, $R^5$ and $R^6$ each independently represents a hydrogen atom, an alkyl group having 1 to 20 carbon atoms, an aryl group having 6 to 20 carbon atoms, an acyl group having 2 to 20 carbon atoms, a (meth)acryloyl group, or a group represented by the following Formula (b) obtained by polymerization of a (meth)acryloyl group, m represents an integer of 1 to 20, and a plurality of $R^4$'s contained in a repeating unit may be the same as or different to each other, and

in Formula (b), * represents an oxygen atom bonded to $R^5$ or $R^6$ in Formula (B), $R^7$ represents a hydrogen atom or a methyl group, q represents an integer of 1 to 10, and a plurality of $R^7$'s contained in a repeating unit may be the same as or different to each other.

2. The film for an agricultural greenhouse according to claim 1 that has a light transmittance equal to or higher than 80%.

3. The film for an agricultural greenhouse according to claim 1 that has a water vapor permeability equal to or higher than 600 g/m²/24 h.

4. The film for an agricultural greenhouse according to claim 2 that has a water vapor permeability equal to or higher than 600 g/m²/24 h.

5. The film for an agricultural greenhouse according to claim 1,
   wherein a degree of acetyl group substitution of the cellulose acylate resin falls within a range of 2.5 to 3.0.

6. The film for an agricultural greenhouse according to claim 2,
wherein a degree of acetyl group substitution of the cellulose acylate resin falls within a range of 2.5 to 3.0.

7. The film for an agricultural greenhouse according to claim 3,
wherein a degree of acetyl group substitution of the cellulose acylate resin falls within a range of 2.5 to 3.0.

8. The film for an agricultural greenhouse according to claim 4,
wherein a degree of acetyl group substitution of the cellulose acylate resin falls within a range of 2.5 to 3.0.

9. An agricultural greenhouse comprising:
a frame; and
a film,
wherein the film is the film for an agricultural greenhouse according to claim 1 and forms a space walled off from the outside by being spread over the frame.

10. An agricultural greenhouse comprising:
a frame; and
a film,
wherein the film is the film for an agricultural greenhouse according to claim 2 and forms a space walled off from the outside by being spread over the frame.

11. An agricultural greenhouse comprising:
a frame; and
a film,
wherein the film is the film for an agricultural greenhouse according to claim 3 and forms a space walled off from the outside by being spread over the frame.

12. An agricultural greenhouse comprising:
a frame; and
a film,
wherein the film is the film for an agricultural greenhouse according to claim 4 and forms a space walled off from the outside by being spread over the frame.

13. An agricultural greenhouse comprising:
a frame; and
a film,
wherein the film is the film for an agricultural greenhouse according to claim 5 and forms a space walled off from the outside by being spread over the frame.

14. An agricultural greenhouse comprising:
a frame; and
a film,
wherein the film is the film for an agricultural greenhouse according to claim 6 and forms a space walled off from the outside by being spread over the frame.

15. An agricultural greenhouse comprising:
a frame; and
a film,
wherein the film is the film for an agricultural greenhouse according to claim 7 and forms a space walled off from the outside by being spread over the frame.

16. An agricultural greenhouse comprising:
a frame; and
a film,
wherein the film is the film for an agricultural greenhouse according to claim 8 and forms a space walled off from the outside by being spread over the frame.

17. The agricultural greenhouse according to claim 9 that does not have a ventilation means for exhausting internal air within the space to the outside.

18. The agricultural greenhouse according to claim 10 that does not have a ventilation means for exhausting internal air within the space to the outside.

19. The agricultural greenhouse according to claim 11 that does not have a ventilation means for exhausting internal air within the space to the outside.

20. The agricultural greenhouse according to claim 13 that does not have a ventilation means for exhausting internal air within the space to the outside.

* * * * *